United States Patent
Han et al.

(10) Patent No.: US 9,720,257 B2
(45) Date of Patent: Aug. 1, 2017

(54) CLIP TYPE DISPLAY MODULE AND GLASS TYPE TERMINAL HAVING THE SAME

(71) Applicant: LG ELECTRONICS INC., Seoul (KR)

(72) Inventors: Jongbeom Han, Seoul (KR); Wonseok Joo, Seoul (KR); Minjong Lee, Seoul (KR); Dongseuck Ko, Seoul (KR); Dongchoon Kim, Seoul (KR); Haklim Lee, Seoul (KR); Jeunguk Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/644,944

(22) Filed: Mar. 11, 2015

(65) Prior Publication Data

US 2015/0261015 A1    Sep. 17, 2015

(30) Foreign Application Priority Data

Mar. 14, 2014    (KR) .................... 10-2014-0030484
Dec. 19, 2014    (KR) .................... 10-2014-0184909

(51) Int. Cl.

| | |
|---|---|
| G02C 1/00 | (2006.01) |
| G02C 11/00 | (2006.01) |
| G02B 27/01 | (2006.01) |
| G06F 1/16 | (2006.01) |
| G02C 9/02 | (2006.01) |
| G02C 9/04 | (2006.01) |
| H04M 1/05 | (2006.01) |
| H04M 1/02 | (2006.01) |

(52) U.S. Cl.
CPC .......... *G02C 11/10* (2013.01); *G02B 27/0176* (2013.01); *G02C 9/02* (2013.01); *G02C 9/04* (2013.01); *G06F 1/163* (2013.01); *H04M 1/0254* (2013.01); *H04M 1/05* (2013.01); *G02B 2027/0143* (2013.01); *G02B 2027/0159* (2013.01); *G02B 2027/0178* (2013.01); *G02C 2200/02* (2013.01); *G02C 2200/26* (2013.01); *H04M 1/0208* (2013.01)

(58) Field of Classification Search
CPC ................................ G02C 11/00; G02C 11/10
USPC ......................................................... 351/158
See application file for complete search history.

(56) References Cited

U.S. PATENT DOCUMENTS

| | | | |
|---|---|---|---|
| 5,943,627 A | 8/1999 | Kim et al. | |
| 6,023,372 A | 2/2000 | Spitzer et al. | |
| 7,631,968 B1 * | 12/2009 | Dobson .................. | H04M 1/05 345/8 |
| 8,238,967 B1 | 8/2012 | Arnold et al. | |

(Continued)

FOREIGN PATENT DOCUMENTS

| | | |
|---|---|---|
| WO | WO 2013/080474 A1 | 6/2013 |
| WO | WO 2013/118433 A1 | 8/2013 |

*Primary Examiner* — Huy K Mai
(74) *Attorney, Agent, or Firm* — Birch, Stewart, Kolasch & Birch, LLP

(57) ABSTRACT

An optical device detachably attached to a frame fixed to a user's head is provided. The optical device includes a body extending in one direction, a display extending in a direction intersecting the one direction, connected to the body, and disposed to be adjacent to the user's eye when fixed to the frame, so as to provide visual information, and a clip module protruding from the body and caught in one region of the frame.

20 Claims, 35 Drawing Sheets

(56) References Cited

U.S. PATENT DOCUMENTS

| | | |
|---|---|---|
| 2005/0130593 A1 | 6/2005 | Michalak |
| 2009/0061926 A1 | 3/2009 | Lee |
| 2010/0245585 A1 | 9/2010 | Fisher et al. |
| 2013/0016426 A1 | 1/2013 | Chiang |
| 2013/0214998 A1 | 8/2013 | Andes et al. |
| 2013/0258270 A1* | 10/2013 | Cazalet ................ G02C 11/10 351/114 |
| 2013/0278631 A1 | 10/2013 | Border et al. |
| 2013/0329183 A1 | 12/2013 | Blum et al. |
| 2014/0028966 A1 | 1/2014 | Blum et al. |
| 2014/0231474 A1 | 8/2014 | Sugihara et al. |
| 2014/0232981 A1 | 8/2014 | Sugihara |
| 2014/0345090 A1* | 11/2014 | Wang ................ G02B 27/0172 24/303 |

\* cited by examiner

CLIP TYPE DISPLAY MODULE AND GLASS TYPE TERMINAL HAVING THE SAME

CROSS-REFERENCE TO RELATED APPLICATIONS

Pursuant to 35 U.S.C. §119(a), this application claims the benefit of earlier filing date and right of priority to Korean Application No. 10-2014-0030484, filed in filed in the Republic of Korea on Mar. 14, 2014, and Korean Application No. 10-2014-0184909, filed in the Republic of Korea on Dec. 19, 2014, the contents of which are expressly incorporated by reference herein in their entireties.

BACKGROUND OF THE INVENTION

Field of the Invention

The present disclosure relates to an optical device that can be detachably attached to a glass type terminal.

Description of Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Efforts are ongoing to support and increase the functionality of mobile terminals. Such efforts include software and hardware improvements, as well as changes and improvements in the structural components.

Recently, a wearable type mobile terminal configured to be worn on a human being's body has been developed. A wearable terminal has a particular structure to be fixed to part of a user's body. For example, a glass type terminal essentially has such a structure that it is worn on both ears and a head. Also, the promotion of functions of the mobile terminal trades off degradation of a design diversity and aesthetic sense.

Also, due to the structural characteristics of glass type terminals to be worn on a human body, there is a limitation in provided power and it is difficult to utilize stored data.

BRIEF SUMMARY OF THE INVENTION

Therefore, an aspect of the detailed description is to provide a mobile terminal which can be detachably attached to a glass type terminal.

To achieve these and other advantages and in accordance with the purpose of this specification, as embodied and broadly described herein, an optical device in a glass type terminal configured to be detachably attached to a frame fixed to a user's head part, wherein the optical device includes a body unit extending in one direction, a display unit extending in a direction intersecting the one direction, connected to one end of the body unit, and disposed to be adjacent to the user's eyes when the display unit is fixed to the frame, so as to provide visual information, and a clip unit protruding from the body unit and caught by one region of the frame.

In an example related to the present disclosure, the clip unit may include: a fixing portion fixed to be movable in the body unit; and a hooked portion extending from the fixing portion and bent again so as to be caught by the frame. The clip unit may be fixed to various regions of various types of frames by the movable hooked portion, and the display unit may be adjusted to be adjacent to one of both eyes of the user.

To achieve these and other advantages and in accordance with the purpose of this specification, as embodied and broadly described herein, a terminal system may include an optical device including a clip unit detachably attached to a frame fixed to a user's body; an external device including a receiving unit configured such that the optical device separated from the frame is installed therein; and a control unit configured to control to transmit and receive signal from the optical device and the external device.

In an example related to the present disclosure, the external device may further include a display unit configured to output visual data, wherein when the optical device is installed in the receiving unit, the control unit may control the display unit to transmit data from the optical device to the external device and output screen information including the data. Accordingly, data collected from the optical device and data regarding a driving log may be easily checked.

In an example related to the present disclosure, the glass type terminal may include a clip module configured to electrically connect the optical device to the frame, and the clip module may include an assembling protrusion protruding from the body unit; an assembling recess formed in the frame to allow the assembling protrusion to be inserted therein; and a connection terminal unit disposed to be adjacent to the assembling protrusion and the assembling recess.

Thus, by electrically connecting the glass type terminal including a frame and the optical device, desired may be transmitted and received between the glass type terminal and the optical device, and any other device which is electrically connected to the glass type terminal and the optical device can be controlled.

According to an exemplary embodiment of the present disclosure, by using the assembling protrusion and the assembling recess connecting the frame and the body unit of the glass type terminal, the optical device can be brought into contact with the optical device. Also, assembling may be strengthened by using an elastic member, and stable contact may be implemented.

Also, since a circuit board of the optical device is disposed within a hinge unit for rotating the body unit, damage due to exposure of the circuit board may be prevented.

Also, the optical device may be installed in a frame of glasses by the clip module, regardless of type of glasses. Also, since a region of the clip module in which the frame is inserted is formed to be adjustable, the optical device may be stably installed in the frame, or the like.

Also, the optical device may be installed in a pouch, a mobile terminal, or a case of a mobile terminal, and the like, so as to be charged, and data collected from the optical device may be output to a display unit formed as a display panel, or the like, to allow the user to check a driving log of the optical device more conveniently.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a term such as "module" and "unit" may be used to refer to elements or components. Use of such term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
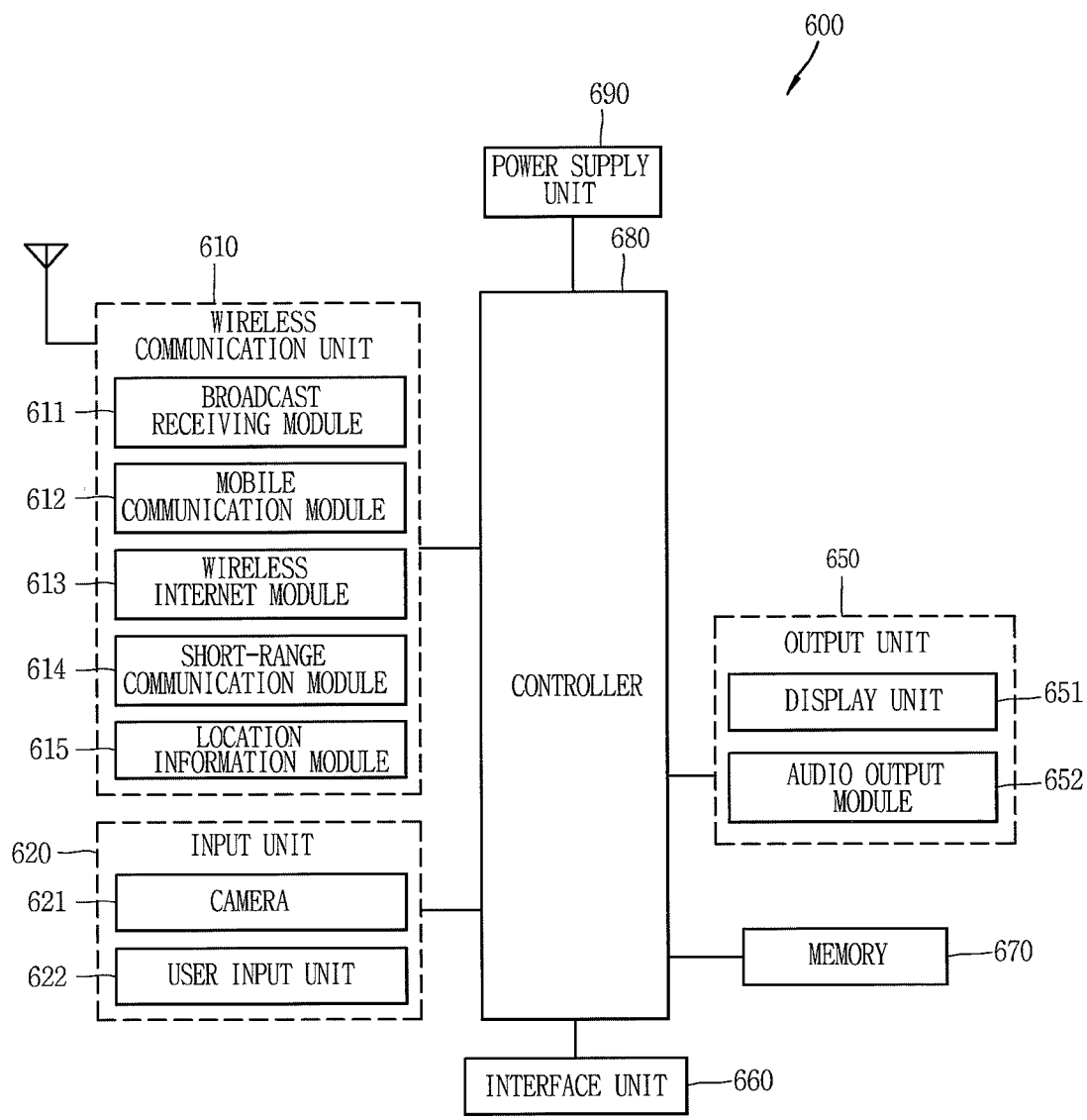
FIG. 1 is a block diagram illustrating components of an optical module related to the present disclosure.

FIG. 1 is a block diagram illustrating a mobile terminal related to the present disclosure.

An optical device 600 is shown having components such as a wireless communication unit 610, an input unit 620, an output unit 650, an interface unit 660, a memory 670, a control unit 680, and a power supply unit 690. It is understood that implementing all of the illustrated components is not a requirement, and that greater or fewer components may alternatively be implemented.

The wireless communication unit 610 typically includes one or more modules which permit communications such as wireless communications between the optical device 600 and a wireless communication system, communications between the optical device 600 and another optical device, communications between the optical device 600 and an external server.

Further, the wireless communication unit 610 typically includes one or more modules which connect the optical device 600 to one or more networks. To facilitate such communications, the wireless communication unit 610 includes one or more of a broadcast receiving module 611, a mobile communication module 612, a wireless Internet module 613, a short-range communication module 614, and a location information module 615.

The input unit 620 includes a camera 621 for obtaining images or video, a microphone 122, which is one type of audio input device for inputting an audio signal, and a user input unit 623 (for example, a touch key, a push key, a mechanical key, a soft key, and the like) for allowing a user to input information. Data (for example, audio, video, image, and the like) is obtained by the input unit 620 and may be analyzed and processed by control unit 680 according to device parameters, user commands, and combinations thereof.

The output unit 650 is typically configured to output various types of information, such as audio, video, tactile output, and the like. The output unit 650 is shown having a display unit 651, an audio output module 652, a haptic module 653, and an optical output module 654.

The display unit 651 may have an inter-layered structure or an integrated structure with a touch sensor in order to facilitate a touch screen. The touch screen may provide an output interface between the optical device 600 and a user, as well as function as the user input unit 623 which provides an input interface between the optical device 600 and the user.

The interface unit 660 serves as an interface with various types of external devices that can be coupled to the optical device 600. The interface unit 660, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the optical device 600 may perform assorted control functions associated with a connected external device, in response to the external device being connected to the interface unit 660.

The memory 670 is typically implemented to store data to support various functions or features of the optical device 600. For instance, the memory 670 may be configured to store application programs executed in the optical device 600, data or instructions for operations of the optical device 600, and the like. Some of these application programs may be downloaded from an external server via wireless communication. Other application programs may be installed within the optical device 600 at time of manufacturing or shipping, which is typically the case for basic functions of the optical device 600 (for example, receiving a call, placing a call, receiving a message, sending a message, and the like). It is common for application programs to be stored in the memory 670, installed in the optical device 600, and executed by the control unit 680 to perform an operation (or function) for the optical device 600.

The control unit 680 typically functions to control overall operation of the optical device 600, in addition to the operations associated with the application programs. The control unit 680 may provide or process information or functions appropriate for a user by processing signals, data, information and the like, which are input or output by the various components depicted in FIG. 1, or activating application programs stored in the memory 670. As one example, the control unit 680 controls some or all of the components illustrated in FIG. 1 according to the execution of an application program that have been stored in the memory 670.

The power supply unit 690 can be configured to receive external power or provide internal power in order to supply appropriate power required for operating elements and components included in the optical device 600. The power supply unit 690 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 670.

Referring still to FIG. 1, various components depicted in this figure will now be described in more detail.

Regarding the wireless communication unit 610, the broadcast receiving module 611 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 611 may be utilized to facilitate simultaneously receiving of two or more broadcast channels, or to support switching among broadcast channels.

The mobile communication module 612 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 612 include audio call signals, video (telephony) call signals, or various formats of data to support communication of text and multimedia messages.

The wireless Internet module 613 is configured to facilitate wireless Internet access. This module may be internally or externally coupled to the optical device 600. The wireless Internet module 613 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 613 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 613 performs such wireless Internet access. As such, the Internet module 613 may cooperate with, or function as, the mobile communication module 612.

The short-range communication module 614 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 614 in general supports wireless communications between the optical device 600 and a wireless communication system, communications between the optical device 600 and another optical device 600, or communications between the mobile terminal and a network where another optical device 600 (or an external server) is located, via wireless area networks. One example of the wireless area networks is a wireless personal area networks.

In some embodiments, another mobile terminal (which may be configured similarly to optical device 600) may be a wearable device, for example, a smart watch, a smart glass or a head mounted display (HMD), which is able to exchange data with the optical device 600 (or otherwise cooperate with the optical device 600). The short-range communication module 614 may sense or recognize the wearable device, and permit communication between the wearable device and the optical device 600. In addition, when the sensed wearable device is a device which is authenticated to communicate with the optical device 600, the control unit 680, for example, may cause transmission of data processed in the optical device 600 to the wearable device via the short-range communication module 614. Hence, a user of the wearable device may use the data processed in the optical device 600 on the wearable device. For example, when a call is received in the optical device 600, the user may answer the call using the wearable device. Also, when a message is received in the optical device 600, the user can check the received message using the wearable device.

The location information module 615 is generally configured to detect, calculate, derive or otherwise identify a position of the mobile terminal. As an example, the location information module 615 includes a Global Position System (GPS) module, a Wi-Fi module, or both. If desired, the location information module 615 may alternatively or additionally function with any of the other modules of the wireless communication unit 610 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 620 may be configured to permit various types of input to the mobile terminal 620. Examples of such input include audio, image, video, data, and user input. Image and video input is often obtained using one or more cameras 621. Such cameras 621 may process image frames of still pictures or video obtained by image sensors in a video or image capture mode. The processed image frames can be displayed on the display unit 651 or stored in memory 670. In some cases, the cameras 621 may be arranged in a matrix configuration to permit a plurality of images having various angles or focal points to be input to the optical device 600. As another example, the cameras 621 may be located in a stereoscopic arrangement to acquire left and right images for implementing a stereoscopic image.

The user input unit 623 is a component that permits input by a user. Such user input may enable the control unit 680 to control operation of the optical device 600. The user input unit 623 may include one or more of a mechanical input element (for example, a key, a button located on a front and/or rear surface or a side surface of the optical device 600, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

A touch sensor can sense a touch applied to the touch screen, such as display unit 651, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 651, or convert capacitance occurring at a specific part of the display unit 651, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 680. Accordingly, the control unit 680 may sense which region of the display unit 651 has been touched. Here, the touch controller may be a component separate from the control unit 680, the control unit 680, and combinations thereof.

In some embodiments, the control unit 680 may execute the same or different controls according to a type of touch object that touches the touch screen or a touch key provided in addition to the touch screen. Whether to execute the same or different control according to the object which provides a touch input may be decided based on a current operating state of the optical device 600 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 680, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 621 typically includes at least one a camera sensor (CCD, CMOS etc.), a photo sensor (or image sensors), and a laser sensor.

Implementing the camera 621 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 651 is generally configured to output information processed in the optical device 600. For example, the display unit 651 may display execution screen information of an application program executing at the optical device 600 or user interface (UI) and graphic user interface (GUI) information in response to the execution screen information.

In some embodiments, the display unit 651 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 652 is generally configured to output audio data. Such audio data may be obtained from any of a number of different sources, such that the audio data may be received from the wireless communication unit 610 or may have been stored in the memory 670. The audio data may be output during modes such as a signal reception mode, a call mode, a record mode, a voice recognition mode, a broadcast reception mode, and the like. The audio output module 652 can provide audible output related to a particular function (e.g., a call signal reception sound, a message reception sound, etc.) performed by the optical device 600. The audio output module 652 may also be implemented as a receiver, a speaker, a buzzer, or the like.

A haptic module 653 can be configured to generate various tactile effects that a user feels, perceive, or otherwise experience. A typical example of a tactile effect generated by the haptic module 653 is vibration. The strength, pattern and the like of the vibration generated by the haptic module 653 can be controlled by user selection or setting by the control unit. For example, the haptic module 653 may output different vibrations in a combining manner or a sequential manner.

Besides vibration, the haptic module 653 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 653 can also be implemented to allow the user to feel a tactile effect through a muscle sensation such as the user's fingers or arm, as well as transferring the tactile effect through direct contact. Two or more haptic modules 653 may be provided according to the particular configuration of the optical device 600.

An optical output module 654 can output a signal for indicating an event generation using light of a light source. Examples of events generated in the optical device 600 may include message reception, call signal reception, a missed call, an alarm, a schedule notice, an email reception, information reception through an application, and the like.

A signal output by the optical output module 654 may be implemented in such a manner that the mobile terminal emits monochromatic light or light with a plurality of colors. The signal output may be terminated as the mobile terminal senses that a user has checked the generated event, for example.

The interface unit 660 serves as an interface for external devices to be connected with the optical device 600. For example, the interface unit 660 can receive data transmitted from an external device, receive power to transfer to elements and components within the optical device 600, or transmit internal data of the optical device 600 to such external device. The interface unit 660 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the optical device 600 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 660.

When the optical device 600 is connected with an external cradle, the interface unit 660 can serve as a passage to allow power from the cradle to be supplied to the optical device 600 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 670 can store programs to support operations of the control unit 680 and store input/output data (for example, phonebook, messages, still images, videos, etc.). The memory 670 may store data related to various patterns of vibrations and audio which are output in response to touch inputs on the touch screen.

The memory 670 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The optical device 600 may also be operated in relation to a network storage device that performs the storage function of the memory 670 over a network, such as the Internet.

The control unit 680 may typically control the general operations of the optical device 600. For example, the control unit 680 may set or release a lock state for restricting a user from inputting a control command with respect to applications when a status of the mobile terminal meets a preset condition.

The control unit 680 can also perform the controlling and processing associated with voice calls, data communications, video calls, and the like, or perform pattern recognition processing to recognize a handwriting input or a picture drawing input performed on the touch screen as characters or images, respectively. In addition, the control unit 680 can control one or a combination of those components in order to implement various exemplary embodiments disclosed herein.

The power supply unit 690 receives external power or provides internal power and supplies the appropriate power required for operating respective elements and components included in the optical device 600. The power supply unit 690 may include a battery, which is typically rechargeable or be detachably coupled to the terminal body for charging.

The power supply unit 690 may include a connection port. The connection port may be configured as one example of the interface unit 660 to which an external charger for supplying power to recharge the battery is electrically connected.

As another example, the power supply unit 690 may be configured to recharge the battery in a wireless manner without use of the connection port. In this example, the power supply unit 690 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
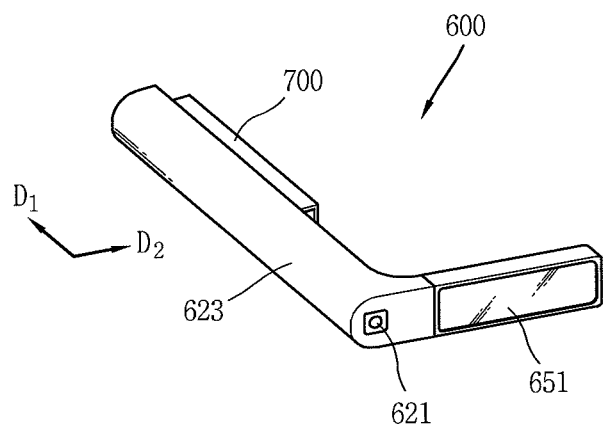
FIG. 2 is a view illustrating an optical device according to an exemplary embodiment of the present disclosure viewed in one direction.
Figure 3:
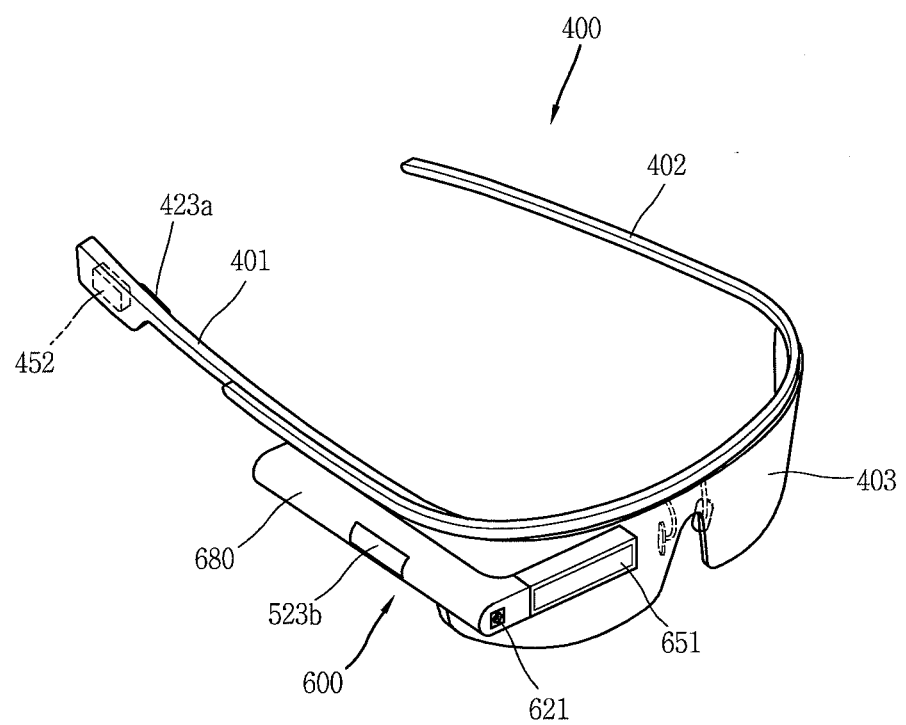
FIG. 3 is a conceptual view illustrating a state in which the optical device is installed in a frame to be fixed to a user's body.

FIG. 2 is a view illustrating an optical device according to an exemplary embodiment of the present disclosure viewed in one direction, and FIG. 3 is a conceptual view illustrating a state in which the optical device is installed in a frame to be fixed to a user's body.

Referring to FIGS. 2 and 3, the optical device 600 includes a main body including a first body 601 and a second body 602, a display unit 651, a user input unit 623, a camera 621, and a clip module 700.

The first body 601 extends in one direction D1, and the second body 602 extends in a second direction D2 crossing the first direction D1, and thus, the first body 601 and the second body 602 have a bar shape. An angle between the first direction D1 and the second direction D2 may be an obtuse angle, but the present disclosure is not limited thereto.

The display unit 651 is disposed in the second body 602, and the user input unit 623 may be disposed in the first body 601. The clip module 700 is fixed to the glass type terminal 400.

The display unit 651 may be realized as a head mounted display (HMD). Here, HMD refers to a display mounted on a head part to directly show the user an image. In a case in which the optical device 600 is mounted on the user's head part, the display unit 651 may be fixed to the glass type terminal 400 and correspond to at least one of a left eye and a right eye so as to directly provide an image in front of user's eyes.

The display unit 651 may project an image to the user's eyes by using a prism. Also, the prism may be formed to be light-transmissive such that the user may view the projected image and a front general visual field (i.e., a range within which objects are visible to the user's eyes).

Thus, the image output through the display unit 651 may be overlap with a general visual field so as to be shown. The optical device 600 may provide an augmented reality (AR) in which a virtual image overlaps on a real image or a background to show a single image by using the characteristics of the display. That is, the display unit 651 may be implemented according to at least one methods among LCOS, LCD, OLED, and T-OLED.

The camera 621 may obtain a scene that the user is viewing, as an image. The optical device 600 may include a plurality of cameras 621 to obtain a stereoscopic image.

The optical device 600 may further include an audio output unit 452 and a battery 490.

The user input unit 623 is formed to receive a control command from the optical device 600. The user input unit 623 may employ any tactile method that allows the user to perform manipulation such as touch, push, scroll, or the like.

An outer surface of the first body 601 in which the user input unit 623 is formed may have a curved surface, but the present disclosure is not limited thereto. Although not shown in detail in the drawings, the user input unit 623 may sense a user's touch input continuously applied in the first direction D1 and generate a control command.

The audio output module 652 may be formed in the other end portion of the first body 601. The audio output module 652 may be configured to produce audio in a general audio output manner or an osteoconductive manner. The audio output module 652 may be formed on the first body 601 so as to be adjacent to the user's ears. When the audio output module 652 is implemented in the osteoconductive manner, the audio output module 652 may be closely adhered to the head when the user wears the optical device 600 and vibrate the user's skull to transfer sounds.

Figure 4A:
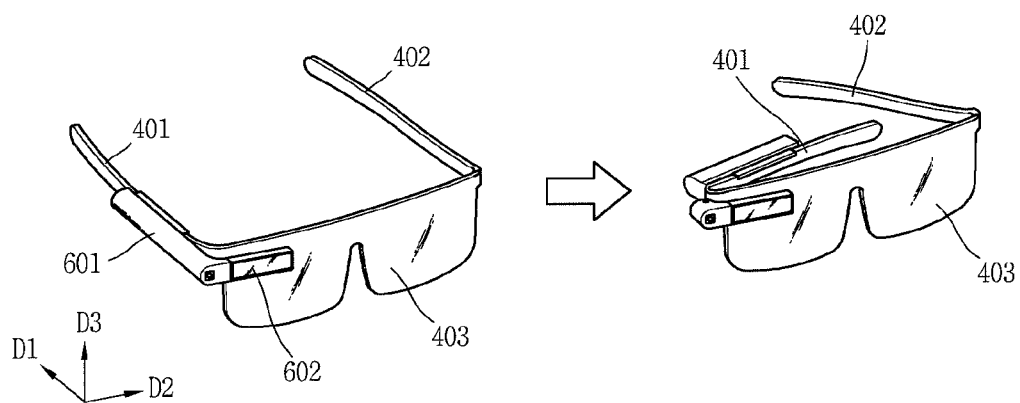
FIGS. 4A and 4B are conceptual views illustrating a driving structure of the glass type terminal to which an optical device is fixed.
Figure 4B:
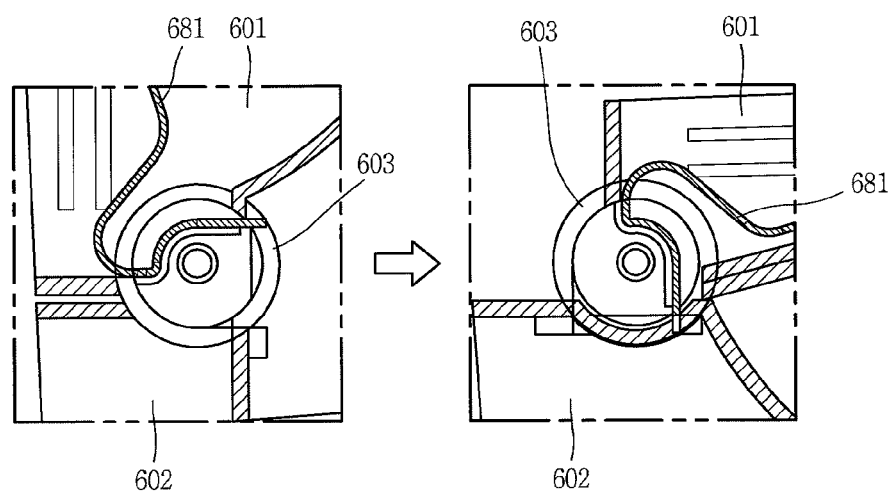

The optical device 600 includes a circuit board 681 (see FIG. 4B). The circuit board 681 may be configured to control various electronic components provided in the optical device 600.

Also, the optical device 600 may further include a microphone receiving a sound and processing the received sound to electrical voice data.

Referring to FIG. 3, the optical device 600 fixed to the first frame 401 by the clip module 700. When the optical device 600 is fixed to the first frame 401 and the glass type terminal 400 is fixed to the user's head part, the display unit 651 may be disposed in front of the user's eyes.

However, the glass type terminal 400 to which the optical device 600 is fixed is not limited to a terminal and any glasses which are used to correct vision or which performs a general function to prevent incidence of light to eyes may be used as the first frame 401. Thus, the optical device 600 does not require a separate fixing device allowing the optical device 600 to be disposed in a region adjacent to the users' eyes. Also, the user may install the optical device 600 to glasses when necessary or may remove the optical device 600 from the glasses when not necessary, through the clip module 700.

However, the first frame 401 may correspond to a glass type fixing structure which is separately manufactured. In this case, in the first frame 401, the glass structure covering the user's eyes may be omitted and the lens may be formed of glass without power.

The optical device 600 may be installed in the user's glasses, or the like, so as to be fixed to the user's body. Thus, the user does not require a separate fixing structure to be additionally installed in his or her body, and when the optical device 600 is not necessary, the user may remove the optical device 600 by using the clip module 700.

When the glass type terminal 400 is changed, the optical device 600 may be deformed in a state of being fixed to the glass type terminal 400. Hereinafter, a driving state of the glass type terminal 400 to which the optical device 600 is fixed will be described. FIGS. 4A and 4B are conceptual views illustrating a driving structure of the glass type terminal to which an optical device is fixed.

The glass type terminal 400 includes a first frame 401 and a second frame 402 extending with a lens 403 interposed therebetween. The first frame 401 and the second frame 402 are spread or folded at a particular angle with respect to the lens 403.

When the first body 601 is fixed to the first frame 401, the second body 602 bent from the first body 601 is disposed on the lens 403. An angle between the first frame 401 and the second frame 402 and the lens 403 is changed according to a usage state of the user. For example, the lens 403 may extend in the second direction and the first frame 401 is oriented in the first direction D1, and in this state, the first frame 401 may be changed to extend in a third direction D3 crossing the first and second directions D1 and D2.

Also, the first frame 401 and the second frame 402 may be changed to be folded so as to overlap with the lens 403 in the second direction D2.

An angle between the first body 601 and the second body 602 is changed according to a change in a state of the first frame 401. Referring to FIG. 4B, the first body 601 and the second body 602 are connected by a hinge unit 603 formed to be rotatable by an external force. The first body 601 and the second body 602 relatively rotate with respect to the hinge unit 603, and the hinge unit 603 is disposed such that a region thereof is exposed. A hinge shaft is formed in the center of the hinge unit 603.

Meanwhile, the first body 601 and the second body 602 include a circuit board 681 for transmitting an electrical signal. The circuit board 681 connects the first body 601 and the second body 602 and electrically connects an electronic component. The circuit board 681 is formed as a flexible circuit board that may be pliable according to a rotation between the first body 601 and the second body 602.

A receiving space is formed within the hinge unit 603 in order to receive the circuit board 681. The receiving space may be formed along the hinge shaft. An internal space is formed within the first body 601 and the second body 602 in order to receive the circuit board 681. Since the circuit board 681 is disposed in the receiving space, even though the first body 601 and the second body 602 relatively rotate, the circuit board 681 is not exposed outwardly.

Referring to FIG. 4B, when the angle between the first body 601 and the second body 602 is reduced, the spread circuit board 681 is folded in the internal space of the first body 601 and the second body 602 so as to be received therein. Accordingly, the circuit board 681 is inserted inside, rather than being exposed, and thus, damage thereto can be prevented.

The clip type mobile terminal according to an exemplary embodiment of the present disclosure may be electrically connected to the glass type terminal 400 installed on the user's head part, and separably fixed thereto. Hereinafter, the optical device 600 according to various exemplary embodiments of the present disclosure will be described.

Figure 5A:
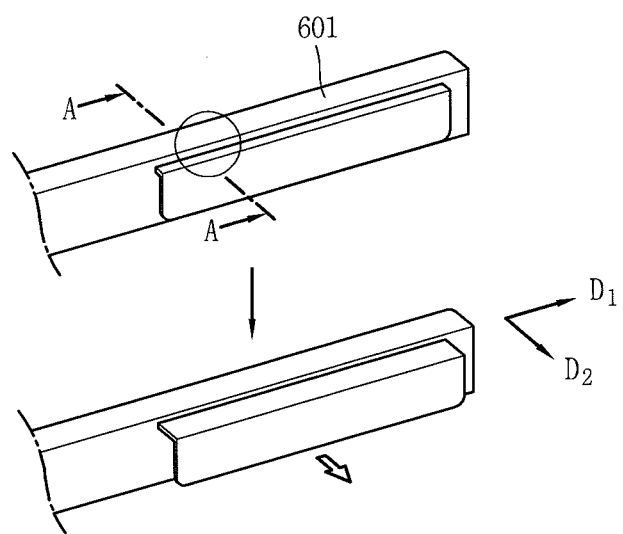
FIGS. 5A(a) and 5A(b) are views illustrating a clip module according to an exemplary embodiment of the present disclosure.
Figure 5A:
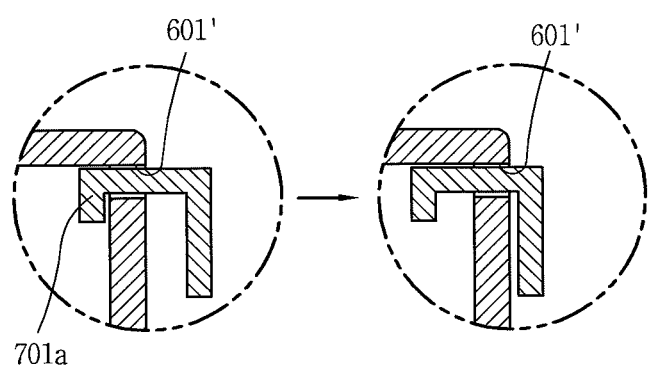

FIGS. 5A(a) and 5A(b) are views illustrating a clip module according to an exemplary embodiment of the present disclosure. Specifically, FIG. 5A(a) is a partial enlarged view of the optical device illustrating a clip module according to an exemplary embodiment of the present disclosure, and FIG. 5A(b) is a partial cross-sectional view of the optical device taken along line A-A.

Referring to FIGS. 5A(a) and 5A(b), the clip module 700 is formed to be caught by (or hung up on) the first frame 401. The clip module 700 protrudes from one surface of the first body 601. For example, the clip module 700 protrudes from an inner surface of the first body 601 in a direction intersecting the first direction D1.

For example, the clip module 700 includes a hooked portion 701a formed to have a structure bent at a preset angle (e.g., about 90 degrees). In order to minimize separation of the first frame 401 from the clip module 700, the preset angle may be an acute angle. One cross-section of the hooked portion 701a may have an "L" shape. A portion of the first frame 401 is inserted in a space between the hooked portion 701a and one cross-section of the first body 601.

Meanwhile, the clip module 700 may extend in the first direction D1. Alternatively, the clip module 700 may include a plurality of protrusion members spaced apart from one another by a preset interval.

Referring to FIG. 5A(a), the clip module 700 is formed to be movable on the first body 601. In a case in which the third direction D3 perpendicular to the first direction D1 is defined as a thickness direction of the first body 601, the clip module 700 is formed to reciprocate in the third direction D3 as the user applies force thereto. Namely, the clip module 700 is formed such that one region thereof is inserted into the interior of the first body 601 and protrudes to the outside of the first body 601.

Referring to FIG. 5A(b), the first body 601 includes a hole 601' formed to corresponding to a length of the clip module 700. Also, the first body 601 may have an internal space communicating with the hole 601'.

A portion of the clip module 700 passes through the hole 601' so as to be positioned in the internal space. The clip module 700 is positioned in the internal space, and in order to prevent separation of the clip module 700 from the hole 601', the clip module 700 includes a first fixing portion 702.

Thus, even when the user applies pressure, separation of the clip module 700 from the first body 601 may be prevented.

By external pressure applied to the hooked portion 701a, the hooked portion 701a passes through the hole 601' and moves in the third direction D3.

The clip module 700 may further include an elastic member providing elastic force to allow the hooked portion 701a to be moved to the interior of the first body 601. Accordingly, the user may pull the hooked portion 701a from the first body 601 to form a space and insert the frame.

Alternatively, the hooked portion 701a may be inserted between an outer surface of the hooked portion 701a passing through the hole 601' and an inner circumferential surface (or an outer surface of the body unit).

For example, a protrusion, a recess, a spiral structure, and the like, generating frictional contact may be formed on the outer circumferential surface of the hooked portion 701a or the outer circumferential surface of the hole 601'. Accordingly, the user may insert the frame between the first body 601 and the hooked portion 701a and move the hooked portion 701a to more stably fix the frame to the clip module 700.

In this case, the hooked portion 701a and one surface of the first body 601 may be integrally formed.

According to the present exemplary embodiment, a width of the space between the first body 601 and the hooked portion 701a may be adjusted, and frames having various thicknesses may be inserted into the space. That is, the optical device may be applied to glasses having various types of frames.

Also, in a state in which the hooked portion 701a is caught on the first frame 401, the optical device 600 may be more stably fixed to the first frame 401 by adjusting the space between the hooked portion 701a and the first body 601.

Figure 5B:
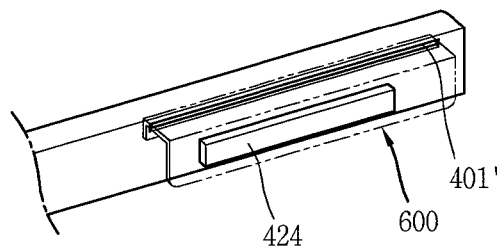
FIGS. 5B(a) and 5B(b) are conceptual views illustrating an optical device according to another exemplary embodiment of the present disclosure.
Figure 5B:
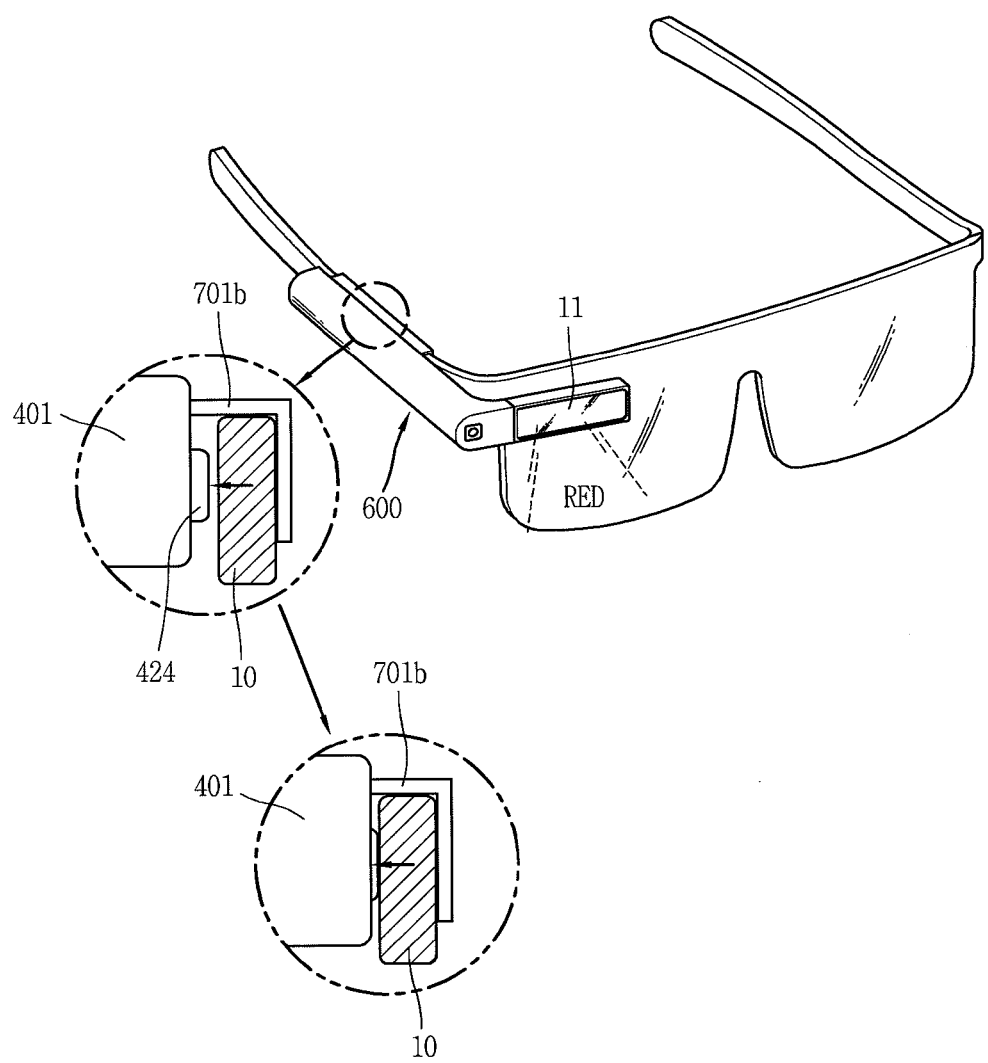

FIGS. 5B(a) and 5B(b) are conceptual views illustrating an optical device according to another exemplary embodiment of the present disclosure. Specifically, FIG. 5B(a) is a partial exploded view illustrating a push key 424 included in the optical device 600 according to another exemplary embodiment of the present disclosure, and FIG. 5B(b) is a conceptual view illustrating a control method of outputting notification information according to the push key 424.

Referring to FIG. 5B(a), an optical device 600 according to the present exemplary embodiment has the push key 424 formed on one surface of the first body 601 on which the hooked portion 701b is formed. The push key 424 is deformed by an external force applied from the outside and generates a signal.

The push key 424 may be formed to overlap with the hooked portion 701b. When the push key 424 is not pressed, the control unit controls the display unit 651 to output first notification information 11. For example, the first notification information 11 may correspond to light having a preset color or may correspond to a particular icon, or the like.

Meanwhile, when the push key 424 is pressed by an external force, the control unit controls the display unit 651 to limit output of the first notification information 11. In a case in which the first frame 401 is inserted between the hooked portion 701b and the first body 601 and the first frame 401 presses the push key 424 by a force applied between the hooked portion 701b and the first body 601, output of the first notification information 11 is limited.

That is, when the first frame 401 is not stably fixed by the hooked portion 701b, corresponding information is provided to the user by the first notification information 11 on the display unit 651. Also, when the first frame 401, the first body 601, and the hooked portion 701b are tightly attached according to a movement of the hooked portion 701b, it is determined that the hooked portion is stably installed on the first frame 401, and output of the first notification information 11 is limited.

According to the present exemplary embodiment, the user may install the optical device in glasses, or the like, and used in a more stable state.

Figure 6A:
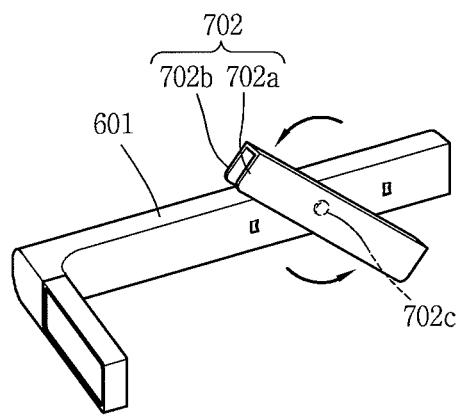
FIGS. 6A(a) and 6A(b) are views illustrating a clip module according to another exemplary embodiment of the present disclosure.
Figure 6A:
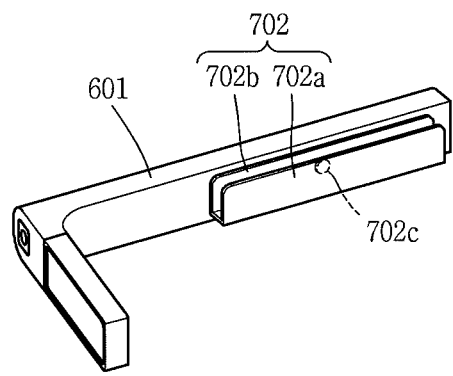

FIGS. 6A(a) and 6A(b) are views illustrating a clip module according to another exemplary embodiment of the present disclosure. Referring to FIGS. 6A(a) and 6A(b), a clip module 702 includes a hooked portion 702a and a second fixing portion 702b extending from the hooked portion 702a. The second fixing portion 702b is formed to overlap with one surface of the first body 601. The second fixing portion 702b may be integrally formed with the hooked portion 702a at a preset angle. The preset angle may be about 90 degrees. That is, cross-sections of the hooked portion 702a and the second fixing portion 702b may have a channel shape ("⌊" shape).

Referring to FIGS. 6A(a) and 6A(b), the clip module 702 may further include a fastening pin 702c formed on the second fixing portion 702b. The fastening pin 702 is fixed to a fastening hole formed in the first body 601 by passing through one region of the second fixing portion 702b. That is, the clip module 702 is formed to be rotatable with respect to the fastening pin 702c in a state of being connected to the first body 601.

By rotation of the clip module 702, the first body 601 may be fixed to one region of the first frame 401. For example, in a case in which the first frame 401 includes a pair of leg portions hung on both ears, it may be implemented such that the hooked portion 702a is hung on one leg portion among the pair of leg portions by rotation of the clip module 702.

Accordingly, the user may install the clip module 702 in one of both leg portions such that the display unit is disposed to be close to one eye.

Figure 6B:
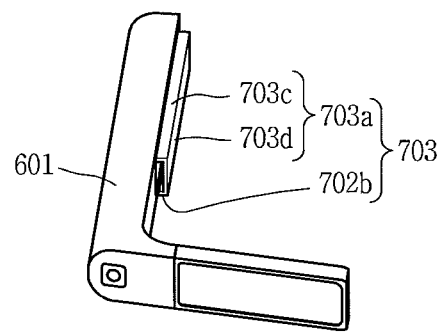
FIGS. 6B(a) and 6B(b) are views illustrating a clip module according to another exemplary embodiment of the present disclosure.
Figure 6B:
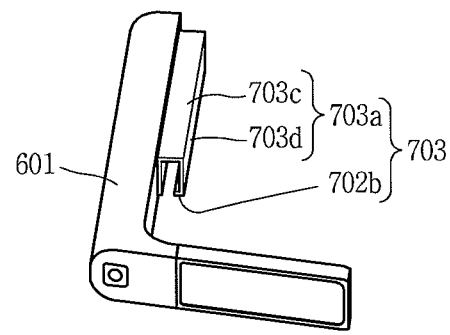

FIGS. 6B(a) and 6B(b) are views illustrating a clip module according to another exemplary embodiment of the present disclosure. A clip module 703 according to the present exemplary embodiment includes a hooked portion 703a and a support portion 702b extending from the hooked portion 703a. Other components of the clip module 703, excluding the support portion 702b, are substantially the same as those of the clip module 700 of FIG. 5A(a), and thus, redundant descriptions thereof will be omitted.

Referring to FIGS. 6B(a) and 6B(b), the hooked portion 703a includes a first surface 703c and a second surface 703d. The first surface 703c and the second surface 703d are formed in mutually intersecting directions. That is, the first surface 703c and the second surface 703d are formed to be bent at a preset angle. The support portion 702b is formed from the second surface 703d. The support portion 702b may be formed at a preset angle with respect to the second surface 703d, and the support portion 702b may be formed to be parallel to the first surface 703c.

FIG. 6B(a), illustrates a first state of the clip module 703, and FIG. 6B(b) illustrates a second state of the clip module 703. In the first state, a gap space is formed between the support portion 702b and the first body 601. The first frame 401 may pass through the space. That is, in the first state, the first frame 401 passes through the gap space and is installed in the space between the hooked portion 703a and the first body 601.

The clip module 703 may further include an elastic member providing elastic force enabling the hooked portion 703a to move to the interior of the first body 601.

In a state in which the first frame 401 is installed in the space, the state may be changed to the second state. In the second state, the edge of the support portion 702*b* is tightly attached to the first body 601. That is, the hooked portion 703*a* is moved to the interior of the first body 601 through the hole 601' (see FIG. 5A(a)). Accordingly, the gap space is removed and separation of the first frame 401 from the clip module 703 is blocked.

In the clip module according to the present exemplary embodiment, the first frame 401 cannot be separated in the direction of gravity, the optical device 600 may be installed in both leg portions.

Also, a problem in which the optical device 600 is separated due to vibrations applied to the first frame 401 in a state in which the clip module 703 is installed in the first frame 401 can be solved.

Although not specifically illustrated in the drawings, the clip module 703 may further include a fixing structure for maintaining the first and second states.

As described above, the optical device 600 may be installed in a frame fixed to the user's head part so as to be used. However, the present disclosure is not limited thereto and when the optical device 600 is not installed in the user's body, the optical device 600 may interwork with an external device to execute a preset function. Hereinafter, an external device interworking with the optical device 600 and a system including the same will be described.

Figure 7A:
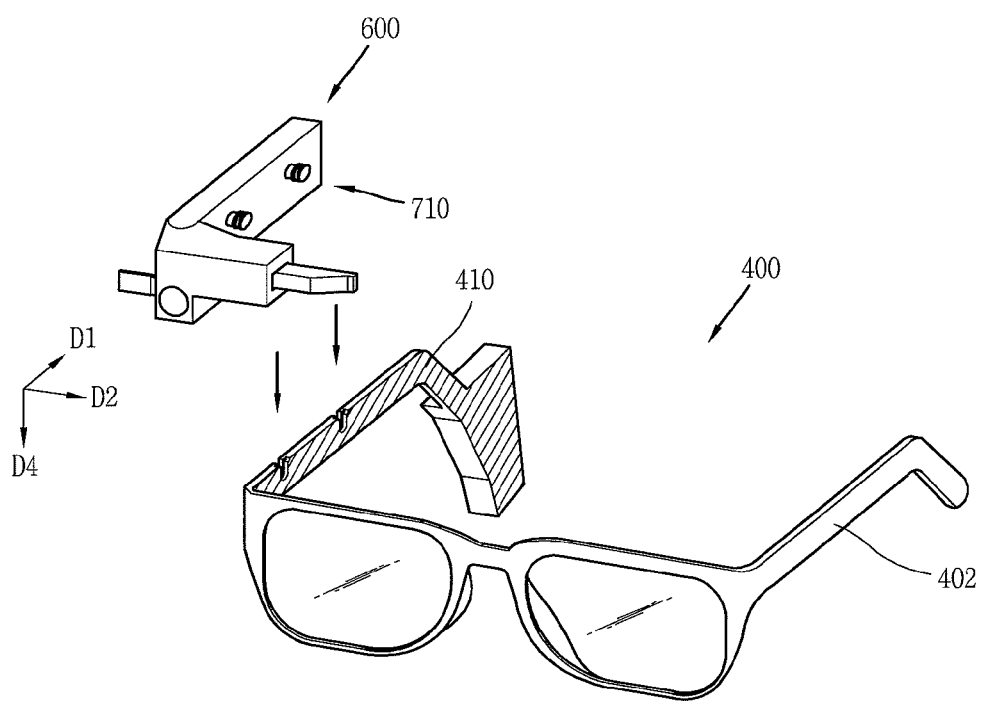
FIGS. 7A through 7E are views illustrating a clip module according to an exemplary embodiment of the present disclosure.

FIGS. 7A through 7E are views illustrating a clip module according to an exemplary embodiment of the present disclosure. FIG. 7A is a conceptual view illustrating the optical device 600 is installed in the glass type terminal 400. The optical device 600 moves in a fourth direction D4 perpendicular to the first and second directions D1 and D2 so as to be inserted into the glass type terminal 400.

Figure 7B:
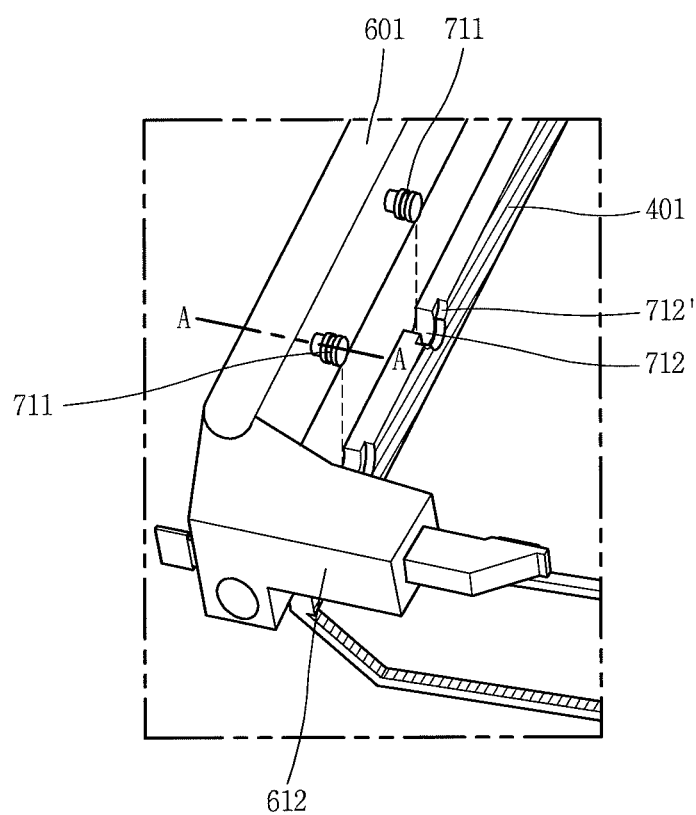

Referring to FIG. 7B, the clip module 710 of the optical device 600 includes at least one assembling protrusion 711 protruding from an outer surface of the first body 601 and an assembling recess 712 recessed on the first frame 401 in the fourth direction D4 and formed to allow the assembling protrusion 711 to be inserted thereinto. The clip module 710 may include a plurality of assembling protrusions disposed to be spaced apart from one another. The assembling protrusion 711 may have a cylindrical shape and a cross-section of the assembling recess 712 may have a circular shape.

Figure 7C:
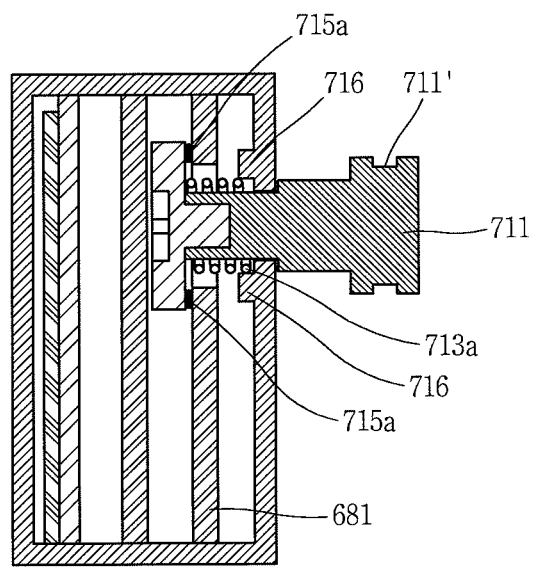

FIG. 7C is a cross-sectional view of the first body 601 including the assembling protrusion 711 taken along line A-A. As illustrated in FIGS. 7B, 7C, and 7E, the clip module 710 may further include first and second elastic members 713*a*, 713*b*, a fastening screw 714, first and second contact terminals 715*a* and 715*b*, and a guide protrusion 716.

The assembling protrusion 711 penetrates through one surface of the first body 601. The assembling protrusion 711 is fixed by the fastening screw 714 within the first body 601. The assembling protrusion 711 penetrates through the first body 601 and penetrates through the circuit board 681. The fastening screw 714 is fastened to the assembling protrusion 711 by penetrating through the circuit board 681.

The fastening screw 714 includes a fastening unit 714*a* fastened to the assembling protrusion 711 and a head portion 714*b* overlapping with one region of the circuit board 681.

The first elastic member 713*a* is disposed to elastically support the head portion 714*b* and an inner surface of the first body 601. The first elastic member 713*b* may be formed as a spring covering an outer circumferential surface of the assembling protrusion 714.1

The guide protrusion 716 protrudes from an inner circumferential surface of the first body 601 and formed to surround the vicinity of the first elastic member 713*b*. A movement and release of the first elastic member 713*b* and the assembling protrusion 711 may be prevented by the guide protrusion 716.

The first elastic member 713*a* provides a preset force when the fastening screw 714 and the assembling protrusion 711 are fastened, whereby the circuit board 681 is prevented from being warped or damaged. Also, the first support member 713*a* supports the first connection terminal 715*a* and the circuit board 681 such that they are not separated.

In a state in which the assembling protrusion 711 is inserted into the assembling recess 712, one surface of the first frame 401 may be coplanar with an end portion of the protrusion 711.

The first connection terminal 715*a* is formed in one region of the head portion 714*b* of the fastening screw 714 facing the circuit board 681. The fastening screw 714 and the assembling protrusion 711 are formed of conductive members which are electrified. The first connection terminal 715*a* is electrically connected to the circuit board 681.

Meanwhile, the assembling protrusion 711 is formed on an outer circumferential recess 711' in a portion of the outer circumferential surface. Also, a depressed portion 712' extending from the assembling recess 712 may be formed. In a state in which the assembling protrusion 711 is inserted into the assembling recess 712, the user may insert his or her nail, or the like, into the outer circumferential recess 711' to provide a force of pulling. The assembling protrusion 711 in a state of being fastened with the fastening screw 714 is protruded by the first elastic member 713*a*. The assembling protrusion 711 may be pulled out of the surface of the first frame 401 and pushed in a direction opposite to the fourth direction D4 in order to separate the assembling protrusion 711 from the assembling recess 712.

Figure 7D:
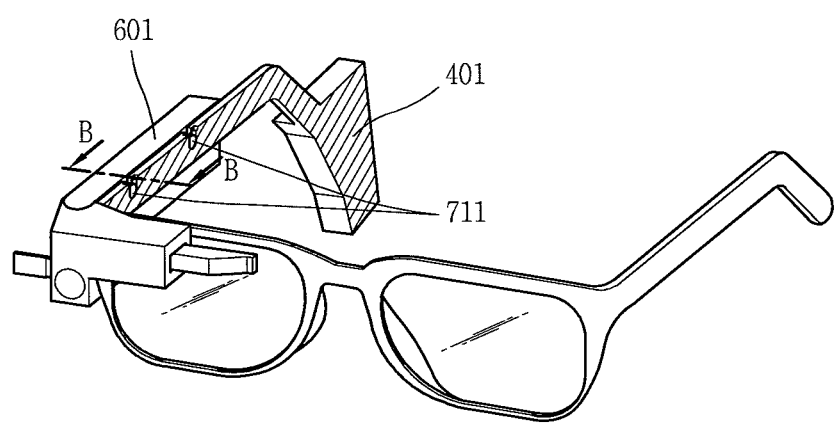
Figure 7E:
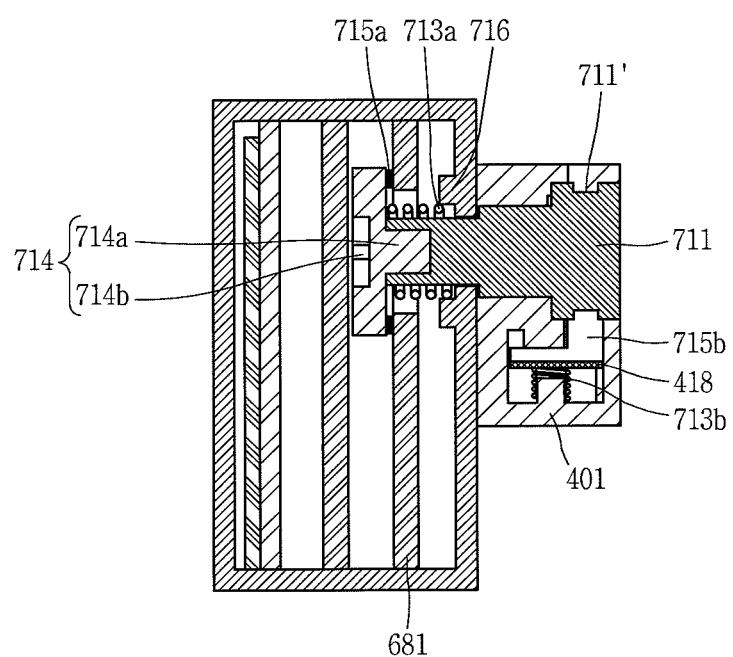

FIG. 7D is a conceptual view illustrating a state in which the first body 601 is coupled to the first frame 401, and FIG. 7E is a cross-sectional view taken along line B-B of FIG. 7D. Although not specifically illustrated in the drawing, a main circuit board 418 is disposed in one region of the first frame 401, and electrically connected to the circuit board 681 by the clip module 710.

The circuit board 418 is disposed within the first frame 401, and the second connection terminal 715*b* electrically connected to the circuit board 418 is disposed. The second connection terminal 715*b* is exposed to the assembling recess 712. In detail, the second connection terminal 715*b* is disposed to protrude from the surface of the first frame 401 forming the assembling recess 712.

The second elastic member 713*b* is formed to elastically support an inner surface of the first frame 401 and the main circuit board 418 in the internal space. The second elastic member 713*b* may include a spring and a guide protrusion in which the spring is inserted. By elastic force of the second elastic member 713*b*, the second connection terminal 715*b* may protrude from the assembling recess 712. Also, when the assembling protrusion 711 is inserted into the assembling recess 712, the second connection terminal 715*b* may move internally.

According to the present exemplary embodiment, the circuit board 681 and the circuit board 418 can be electrically in contact with each other by using the assembling protrusion 711 and the assembling recess 712 connecting the first frame 401 and the first body 601. Also, the assembly may become more firm and a stable contact may be realized by using the elastic member.

Figure 8A:
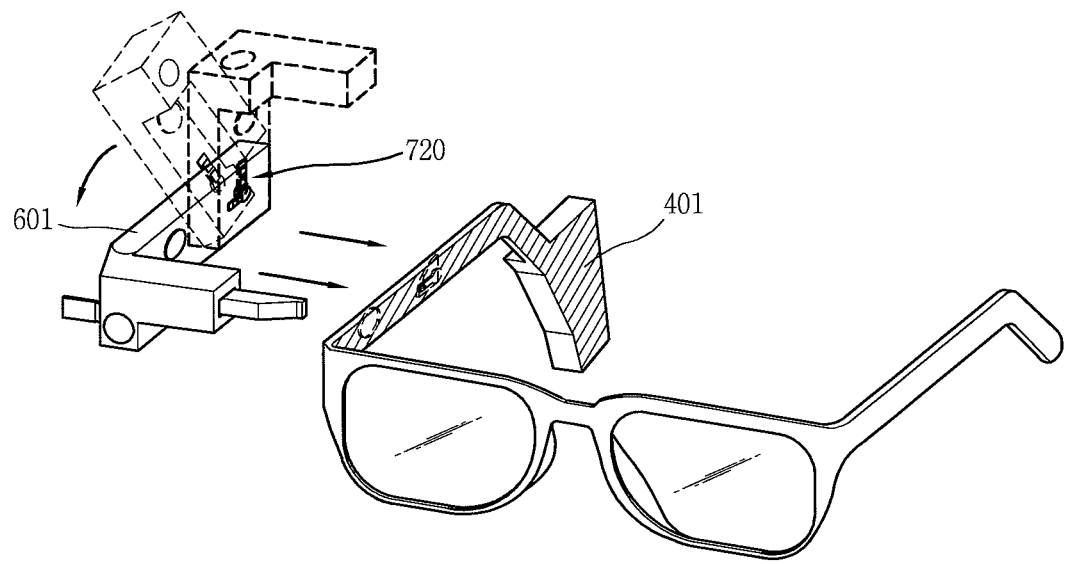
FIGS. 8A through 8C(b) are views illustrating a clip module according to another exemplary embodiment of the present disclosure.
Figure 8B:
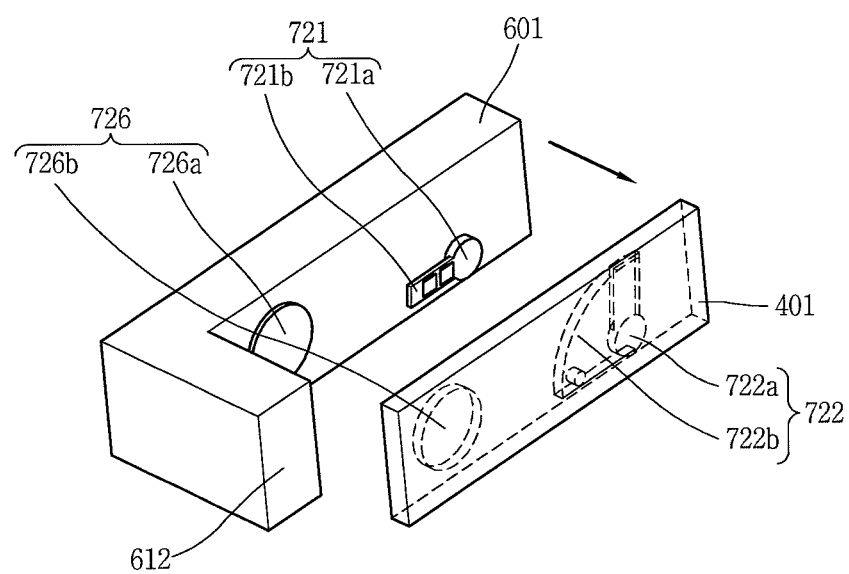
Figure 8C:
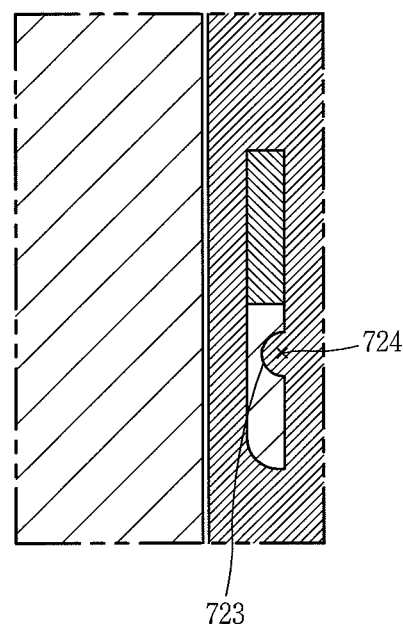
Figure 8C:
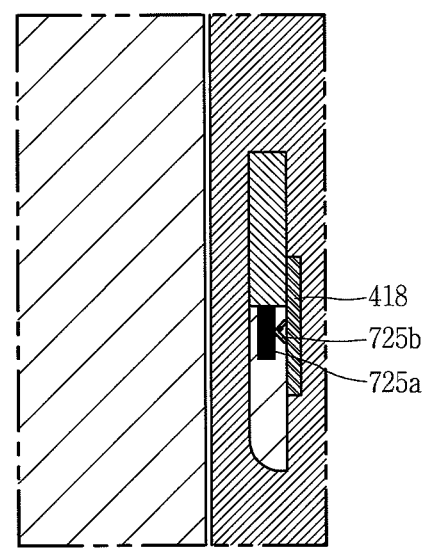

FIGS. 8A through 8C are views illustrating a clip module according to another exemplary embodiment of the present disclosure. FIG. 8A is a conceptual view illustrating a state in which the optical device 600 is installed in the first frame 401. The clip module 720 is positioned in the first frame 401, and in this case, the clip module 720 is rotated to be fixed to the first frame 401. Hereinafter, a structure of the clip module 720 fixed by rotation of the first body 601 will be described in detail.

Referring to FIG. 8B, the clip module 720 includes an assembling protrusion 721, an assembling recess 722, and first and second connection units 725 and 725b.

The assembling protrusion 721 includes a first region 721a rotatably formed on one surface of the first body 601 and a second region 721b extending from the first region 721a in one direction.

A cross-section of the first region 721a may have a circular shape, and the second region 721b may have a hexahedral shape. The second region 721b is not in contact with the first body 601 and disposed to rotate with respect to the first region 721a. A thickness of the first region 721a is greater than that of the second region 721b, and the first and second regions 721a and 721b are formed to be coplanar.

The assembling recess 722 corresponds to shapes of the first and second regions 721a and 721b, and includes a recess region formed to having a thickness substantially same as that of the first region 721a and an internal space 722b formed to have a fan shape allowing the second region n721b to rotate therein.

Referring to FIG. 8C(a), the fixed protrusion 724 is formed in the internal space 722b, and the fixing recess 723 recessed from an outer surface of the second region 721b is formed. In a case in which the second region 721b rotates to be disposed in the direction in which the first frame 401 extends, the fixing protrusion 724 is inserted into the fixing recess 723 to stably couple the assembling protrusion 721 to the internal space 722b.

Referring to FIG. 8C(b), a first connection terminal 725a is formed on an outer surface of the second region 721b and a second connection terminal 725b extending from the main circuit board 418 is disposed in the internal space 722b. For example, the main circuit board 418 is disposed in one region of the internal space 722b, and the second connection terminal 725b may be formed as an electrode clip member. The electrode clip member protrudes from the internal space 722b and pressed to be deformed when the second region 721b rotates to be received in the internal space 722b.

The clip module 720 may include a first magnet unit 726a formed in the first body 601 and a second magnet unit 726b formed in the first frame 401. The first and second magnet units 726a and 726b have different poles to form attractive force when the first body 601 and the first frame 401 approach.

The clip module 720 may stably fix the optical device 600 by using the protrusion structure is received, and since a structure providing electrical contact is disposed therein, a stable connection may be realized.

Figure 9A:
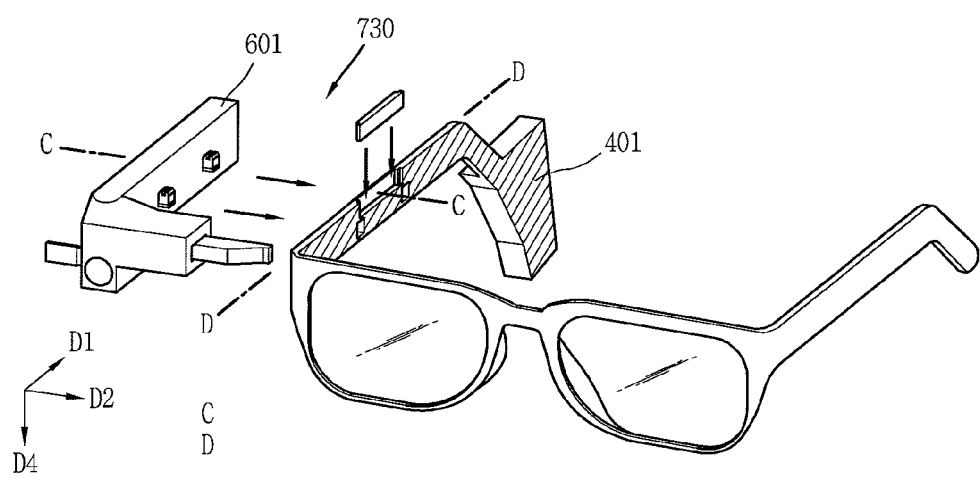
FIGS. 9A through 9D are views illustrating a clip module according to another exemplary embodiment of the present disclosure.

FIGS. 9A through 9D are views illustrating a clip module according to another exemplary embodiment of the present disclosure. FIG. 9A is a conceptual view illustrating a state in which the optical device 600 is installed in the first frame 401.

Referring to FIG. 9A, the optical device 600 is moved in the first direction D1 by moving a fixing plate 732 installed in the first frame 401 and reciprocating in the fourth direction D4, so as to be fixed to the first frame 401.

Figure 9B:
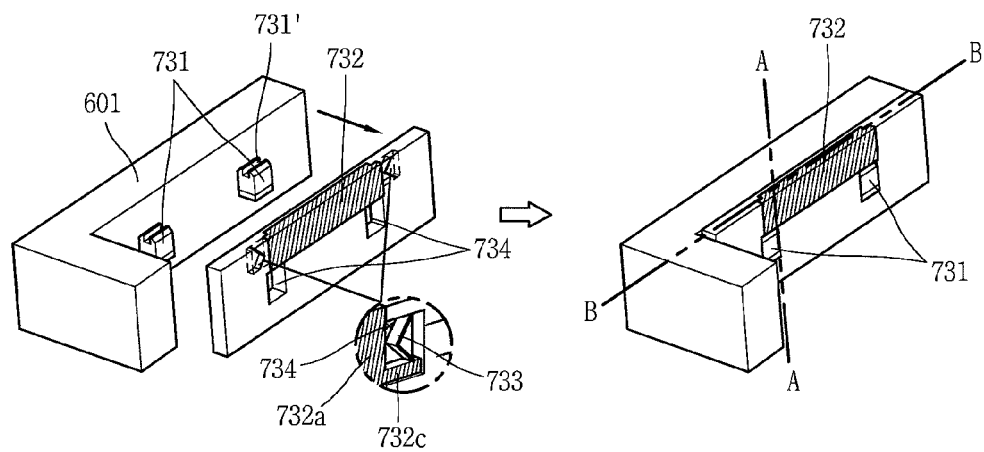

Referring to FIG. 9B, a clip module 730 includes an assembling protrusion 731, an assembling recess 734, and the fixing plate 732.

The assembling protrusion 731 protrudes from an outer surface of the first body 601. One surface of the assembling protrusion 731 includes a fixing recess 731' having a preset thickness and extending by a width of the assembling protrusion 731. The assembling protrusion 731 is inserted into the assembling recess 734. A height of the assembling recess 734 may be lower than that of the assembling protrusion 731.

The fixing plate 732 includes a first region 732a, a second region 732b formed on one edge of the first region 732a and having a sloped surface so as to be inserted into the fixing recess 731', and a third region 732c serving to prevent separation of the fixing plate 732.

The first region 732a has a plate shape. The third region 732c protrudes from one region of the first region 732a in a direction in which the first frame 401 extends, and is disposed to be adjacent to the second region 732b. The second region 732b is formed to be smaller than a thickness of the first region 732a.

Meanwhile, the fixing plate 732 is received in the first frame 401. In detail, the first frame 401 includes a receiving space 733 connected to the assembling recess 734. The receiving space 733 includes a first space 733a receiving the first region 732a and a second space 733b receiving the third region 732c. The second space 732b extends from the first space 733a and is not exposed outwardly.

The third region 732c of the fixing plate 732 is inserted into the second space 732b, and the first elastic member 736a is disposed in the third region 732c. The first elastic member 736b provides elastic force preventing the fixing plate 732 from moving in a direction opposite the fourth direction D4. Thus, the fixing plate 732 may be moved by an external force, but cannot be separated from the first frame 401.

However, the present disclosure is not limited thereto and the fixing plate 732 may be separated from the receiving space 733 and, after the assembling protrusion 731 is inserted into the assembling recess 734, the fixing plate 732 may be inserted to be fixed. In this case, the third region 733c may not be formed.

Figure 9C:
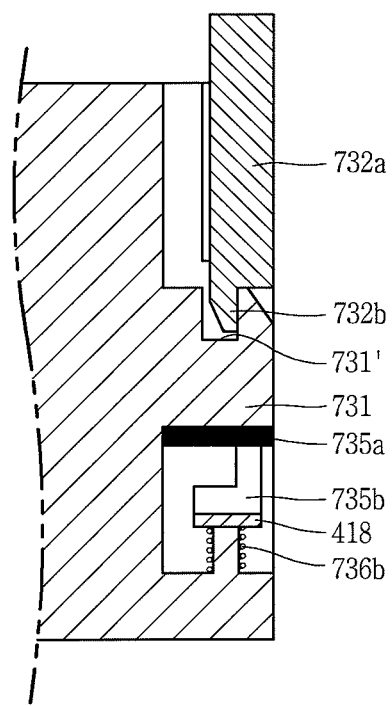
Figure 9D:
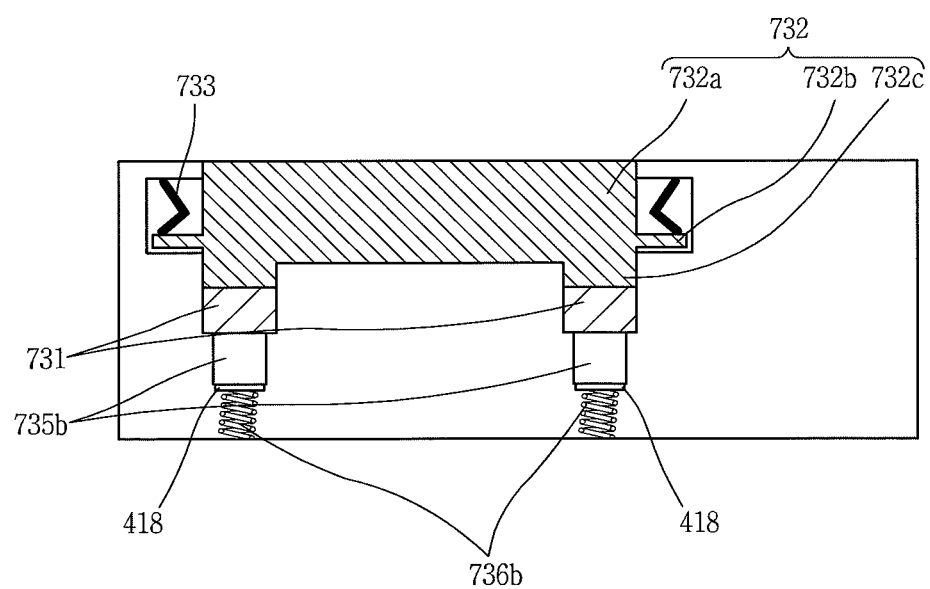

FIG. 9C is a cross-sectional view taken along line C-C of FIG. 9A, and FIG. 9D is a cross-sectional view taken along line D-D of FIG. 9A.

In order to electrically connect the circuit board 681 and the main circuit board 418, the clip module 730 includes the first and second connection terminals 735a and 735b. The first connection terminal 735a is formed on one surface of the assembling protrusion 731. Namely, the first connection terminal 735a is formed on one surface of the assembling protrusion 731, and the fixing recess 731' is formed on the other surface of the assembling protrusion 731.

The second connection terminal 735b is formed on the assembling recess 734. When the assembling protrusion 731 is inserted into the assembling recess 734, the second connection terminal 735b is electrically connected to the first connection terminal 735a. The second connection terminal 735b is electrically connected to the circuit board 418 elastically supported by the second elastic member 736b, and elastically supported together by the second elastic member 735b.

The second connection terminal 735b may be exposed to the assembling recess 734 by the second elastic member 735b.

According to the present exemplary embodiment, the optical device 600 may be more firmly assembled by using the movable fixing plate, and even when the optical device 600 is sloped in various directions, the optical device 600 may be prevented from being separated.

FIGS. 10A through 10D are views illustrating a clip module according to another exemplary embodiment of the present disclosure. FIG. 10 is a conceptual view illustrating a state in which the optical device 600 is installed in the first frame 401. When an external force is applied to the optical device 600 in the second direction D2, the clip module according to the present exemplary embodiment fixes the optical device 600 to the first frame 401.

Referring to FIGS. 10A through 10D, the clip module 740 includes an assembling protrusion 741, an assembling recess 742, and an assembling flange 743. The assembling protrusion 741 has a cylindrical shape and a cross-section of the assembling recess 742 has a circular shape. The assembling flange 743 may be formed as a leaf spring flange formed to cover an outer circumferential surface of the assembling protrusion 741. The assembling protrusion 741 may be fixed to the assembling recess 742 by a bent region formed in the assembling flange 743.

In order to fix the assembling protrusion 741 to the first body unit, the clip module 740 includes a first elastic member 713a, a fastening screw 714, a first connection terminal 715a, and a guide protrusion 716. These are substantially the same as those of the components of the clip module 710 include din the exemplary embodiment of FIG. 7C, and thus the same reference numerals are provided and redundant descriptions thereof will be omitted.

The circuit board 418 is disposed in the first frame 401, and a circular hole corresponding to the assembling recess 742 is formed in one region of the circuit board 418. A second connection terminal 744 is disposed to be adjacent to the circular hole. The second connection terminal 744 is configured as an electrode plate formed through surface mounter technology (SMT).

The second connection terminal 744 has a circular ring shape, and the inner circumference of the second connection terminal 744 is formed to be smaller than an inner circumference of the circular hole. The second connection terminal 744 is disposed within the first frame 401 and overlaps with the circuit board 418.

Figure 10A:
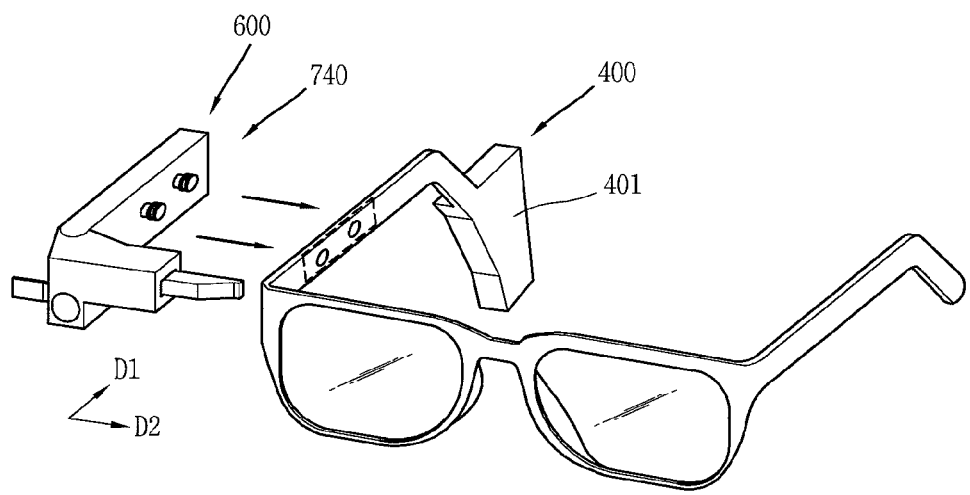
FIGS. 10A through 10E are views illustrating a clip module according to another exemplary embodiment of the present disclosure.
Figure 10B:
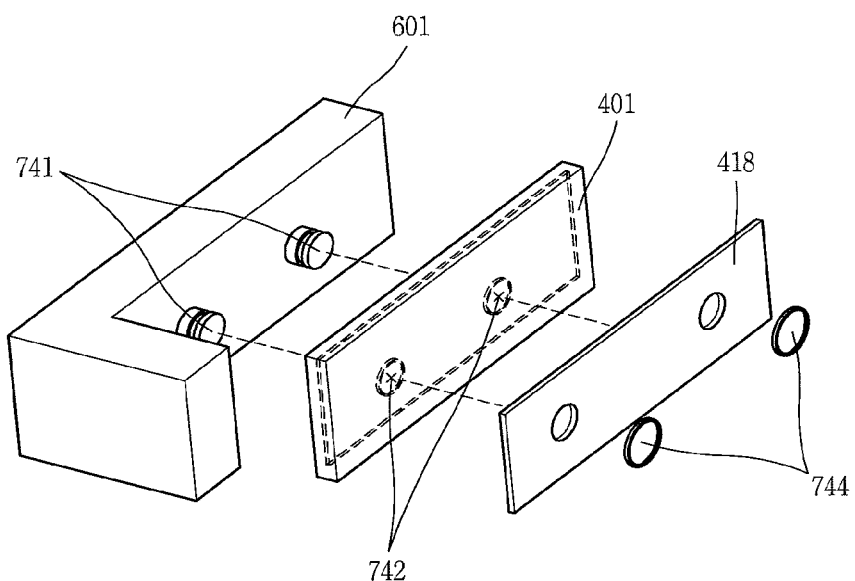
Figure 10C:
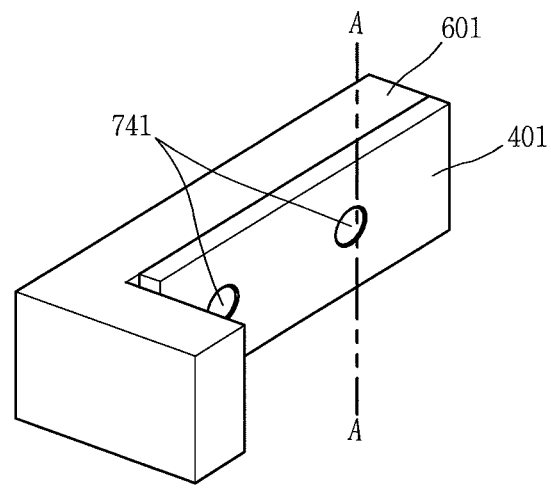
Figure 10D:
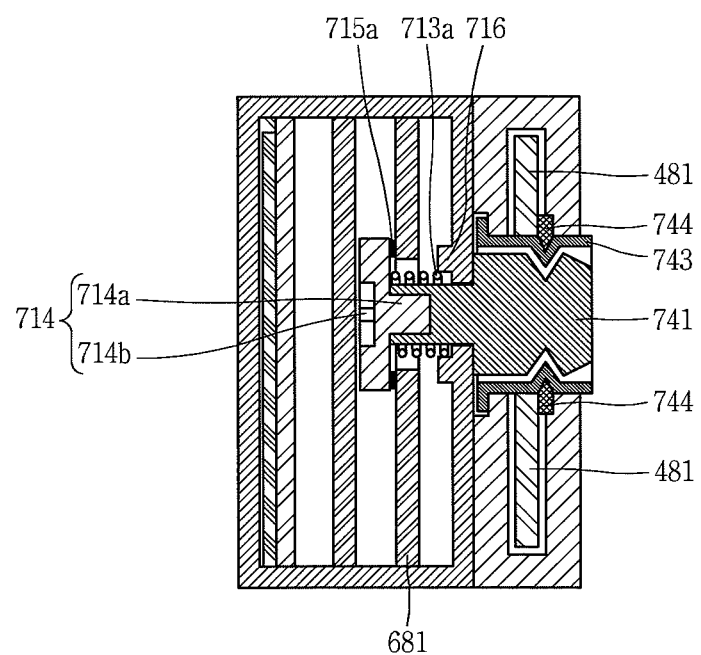
Figure 10E:
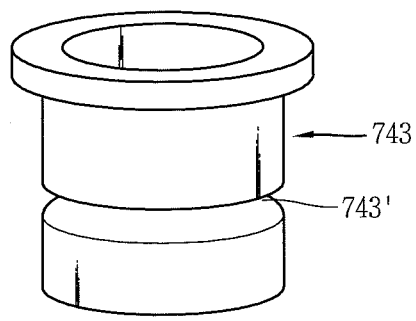

Meanwhile, referring to FIGS. 10D and 10E, a connection recess is formed along an outer circumference in one region of the outer circumferential surface of the assembling protrusion 841 and the assembling flange 743. The connection recess is formed to be recessed from the outer circumferential surface.

When the assembling protrusion 841 and the assembling flange 743 are inserted into the assembling recess 742, the second connection terminal 744 is brought into contact with the connection recess 743'. Accordingly, the second connection terminal 744 electrically connected to the main circuit board 418 may be stably connected to the assembling flange 743.

As described above, the optical device 600 may be installed in a frame fixed to the user's head part, so as to be used. However, the present disclosure is not limited thereto and, when the optical device 600 is not installed in the user's body, the optical device may interwork with an external device and a pre-set function may be executed. Hereinafter, an external device interworking with the optical device 600 and a system including the same will be described.

Figure 11A:
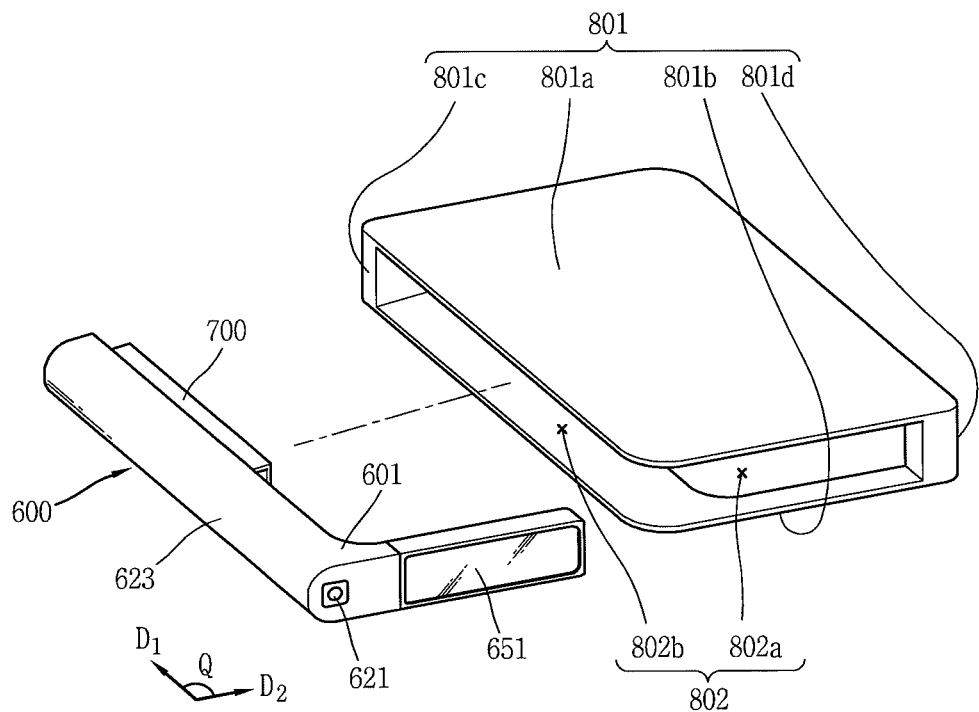
FIGS. 11A and 11B are conceptual views illustrating a system including a terminal pouch for receiving an optical device according to an exemplary embodiment of the present disclosure.
Figure 11B:
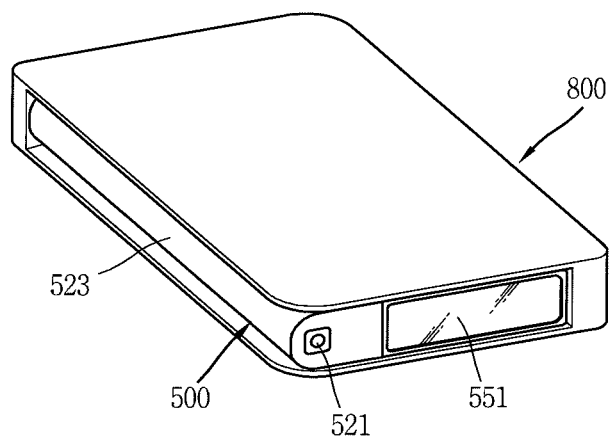

FIGS. 11A and 11B are conceptual views illustrating a system including a terminal pouch for receiving an optical device according to an exemplary embodiment of the present disclosure.

Referring to FIG. 11A, a pouch 801 according to an exemplary embodiment of the present disclosure is formed to include a receiving space for receiving the optical device 600. In detail, the pouch 801 includes first and second support surfaces 801a and 801b facing one another and first and second lateral surfaces 801c and 801d connecting two edges of the first and second support surfaces 801a and 801b. The first lateral surfaces 801c and 801d are formed to be in contact with each other. The pouch 801 includes first and second opening regions 802a and 802b. The first and second opening regions 802a and 802b are formed to face the first and second lateral surfaces 801c and 801d, respectively.

The optical device 600 is received in an internal space of the pouch 800 through the first and second opening regions 802a and 802b. Referring to FIG. 11B, in a state in which the optical device 600 is received in the pouch 800, a portion of the optical device 600 is exposed. That is, the optical device 600 is installed in the pouch 800 such that it forms the edges of a terminal system.

In a state in which the optical device 600 is installed in the pouch 800, the display unit 651, the camera 621, and the user input unit 6233 are exposed outwardly from the pouch 800. Thus, the display unit 651, the camera 621, and the user input unit 623 may be controlled to be continuously activated according to a user setting.

The optical device 600 includes the first body 601 extending in the first direction D1 and the display unit 651 extending in the second direction D2, and when the first and second directions D1 and D2 have a preset included angle (A) therebetween, the pouch 800 may be formed to have a corresponding shape.

In detail, an edge angle of each of the first and second support surfaces 801a and 801b may be formed to be substantially the same as the included angle (A). Also, the length of the edges of the first and second support surfaces 801a and 801b may be formed to correspond to the length of the optical device 600, but the present disclosure is not limited thereto. That is, the pouch 800 may have a shape greater than the optical device 600 due to components received in the pouch 800. That is, components related to the optical device 600 may be disposed within the pouch 800. Hereinafter, component forming an internal structure of the pouch 800 will be described.

Figure 12A:
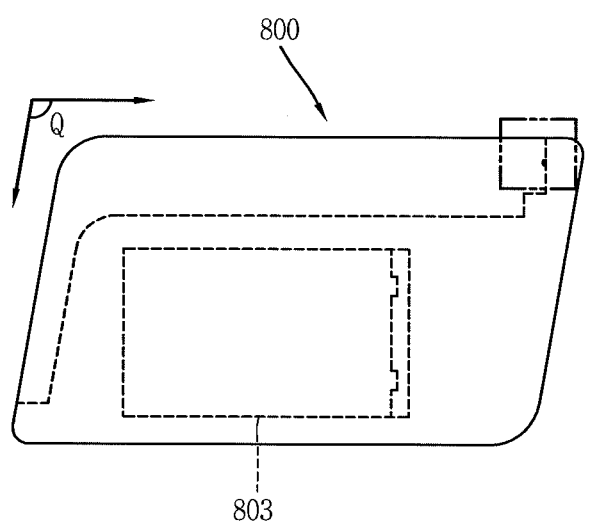
FIG. 12A is a conceptual view illustrating an internal structure of a pouch.

FIG. 12A is a conceptual view illustrating an internal structure of a pouch. Referring to FIG. 12A, a power supply unit 803 is disposed in an internal space of the pouch 800. Although not specifically illustrated in the drawings, a thickness of the power supply unit 803 may be substantially the same as a thickness of the optical device 600. When the optical device 600 is installed in the pouch 800, the power supply unit 803 may supply power to a power supply unit 690 of the optical device 600.

Figure 12B:
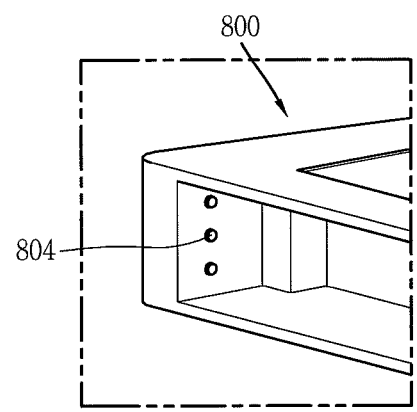
FIGS. 12B and 12C are conceptual views illustrating an electrical connection structure of a pouch and an optical device.
Figure 12C:
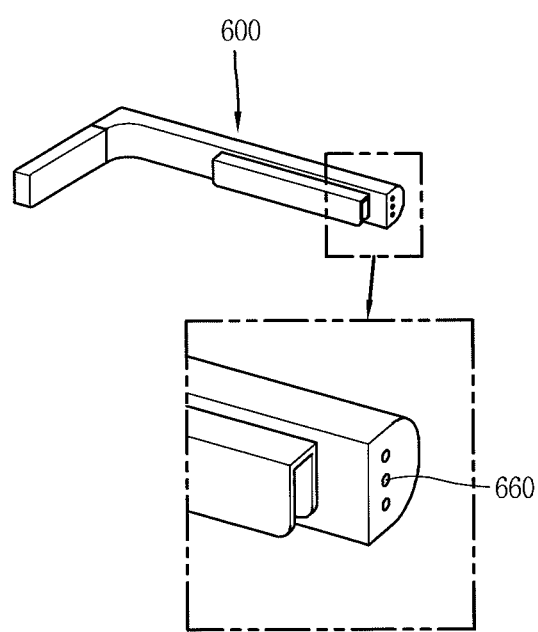

FIGS. 12B and 12C are conceptual views illustrating an electrical connection structure of a pouch and an optical device.

Referring to FIGS. 12B and 12C, a terminal unit 804 is formed on an inner surface of the first lateral surface 801c. Also, a contact portion 660 corresponding to the terminal unit 804 is formed on the other end portion of the first body 601. When it is sensed that the optical device 600 is received in the pouch 800 and the contact portion 660 is brought into contact with the terminal unit 804, the control unit controls the power supply unit 803 to supply power to the power supply unit 690.

Although not specifically shown in the drawings, a fixing frame allowing the optical device 600 to be installed may be formed in the internal space of the pouch 800.

Thus, while the optical device 600 is received in the pouch 800, the optical device may be charged with power. Meanwhile, the pouch 800 may further include an interface for charging power to the power supply unit 803, but the present disclosure is not limited thereto and the power supply unit 803 may correspond to a portable battery (or a dry cell).

Figure 13A:
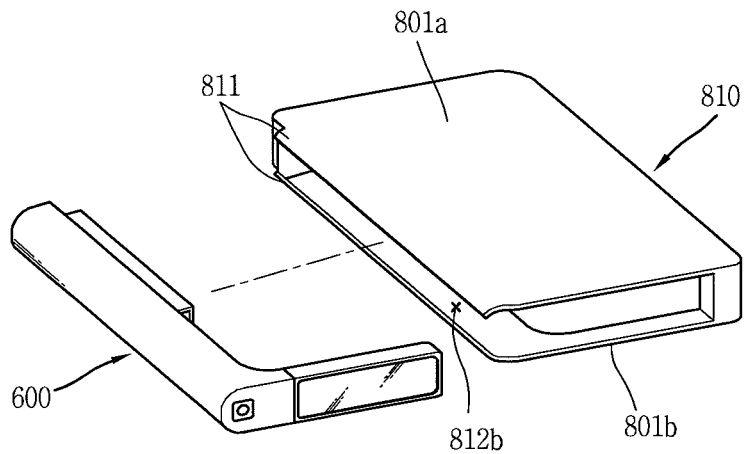
FIGS. 13A(a) through 13C are conceptual views illustrating a pouch including a fixing portion for fixing an optical device.
Figure 13A:
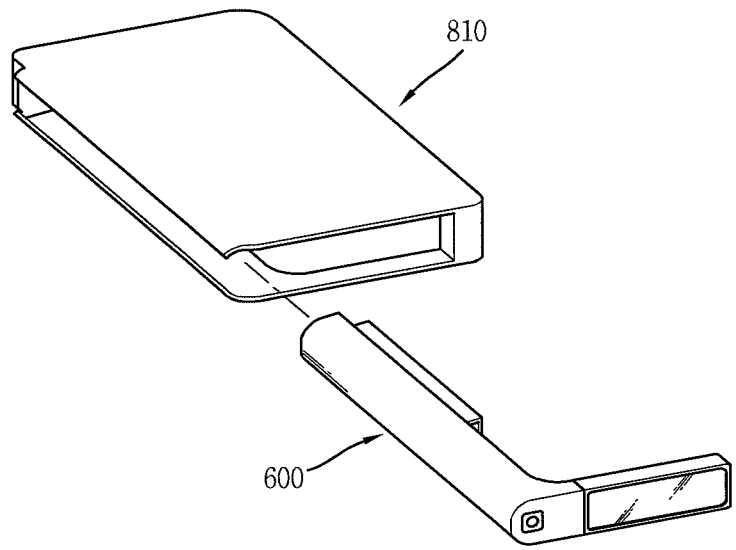
Figure 13A:
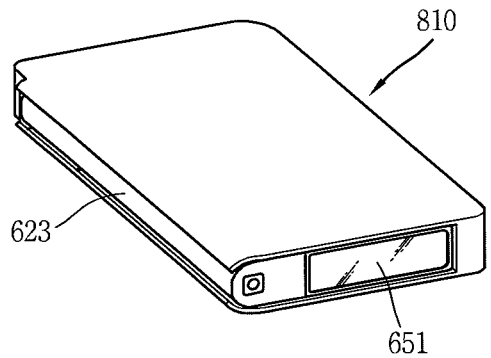
Figure 13B:
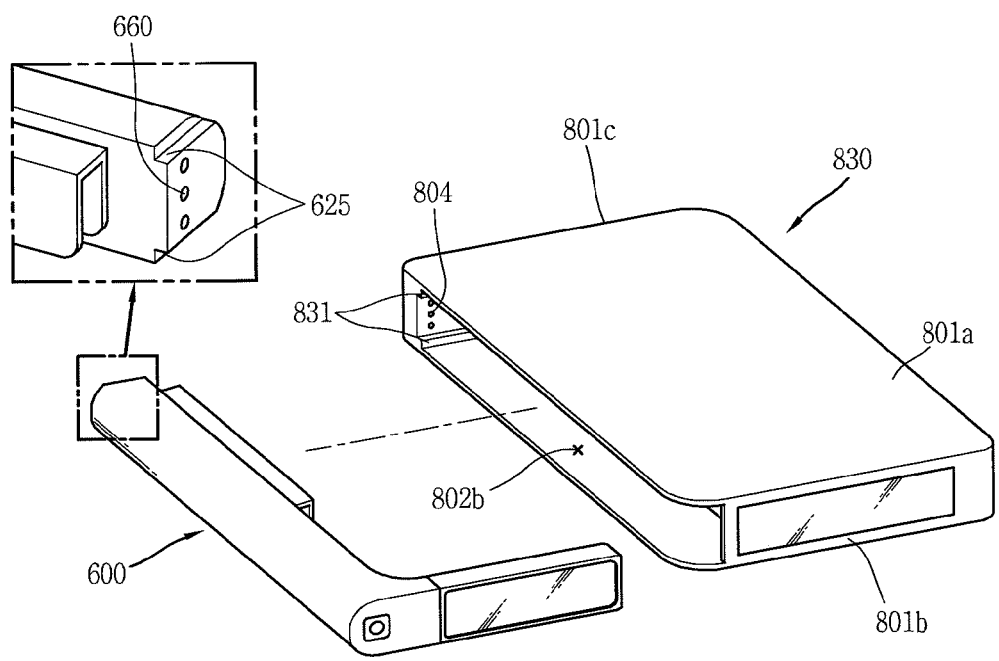
Figure 13C:
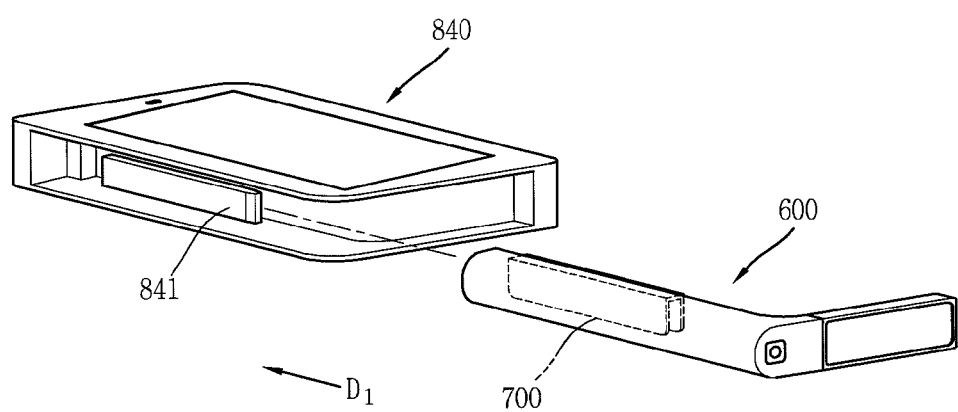

FIGS. 13A through 13C are conceptual views illustrating a pouch including a fixing portion for fixing an optical device.

A pouch 810 of a terminal system according to an exemplary embodiment of the present disclosure illustrated in FIGS. 13A(a) through 13A(c) includes first fixing portions 811 formed on the first and second support surfaces 801a and 801b. The fixing portions 811 are formed as sloped surfaces extending from the first and second support surfaces 801a and 801b and sloped with respect to the first and second support surfaces 801a and 801b.

The first fixing portions 811 are formed as a pair of sloped surfaces extending from the first and second support surfaces 801a and 801b, and the pair of sloped surfaces may extend in a direction toward each other. The pair of sloped surfaces of the first fixing portions 811 form a third opening region 812b.

Referring to FIGS. 13A(a) through 13A(c) and FIG. 11A, positions of the second and third opening regions 801b and 812b are substantially the same in the pouch, but a width of the third opening region 812b is narrower than a width of the second opening region 801b.

Referring to FIGS. 13A(a) and 13A(c), the optical device 600 is received in the receiving space of the pouch 800 through the third opening region 812b. An external structure of the pouch 810 according to the present exemplary embodiment is formed of a material having elastic force.

The first fixing portions 811 formed to have a relatively narrow opening width may prevent the first body 601 from being separated from the pouch 810.

Referring to FIGS. 13A(b) and 13A(c), the optical device 600 may be received to the pouch 810 through the third opening region 812b.

A guide protrusion formed on a pouch 830 and fixing the optical device 600 according to another exemplary embodiment of the present disclosure will be described with reference to FIG. 13B. The pouch 830 according to the present exemplary embodiment includes a guide protrusion 831 for fixing the optical device 600, and the optical device includes a guide recess 625 corresponding to the guide protrusion 831.

In detail, the guide protrusion 831 is formed on an inner surface of the first lateral surface 801c. For example, the guide protrusion 831 may be formed in a region adjacent to the terminal unit 804. The guide recess 625 is formed on the other end portion of the optical device 600 and may be formed to be adjacent to eh contact portion 660.

The guide protrusion 831 and the guide recess 625 may be formed to have a preset length in a direction in which the second lateral surface 801c extends. In the terminal system according to the present exemplary embodiment, the optical device 600 is installed in the pouch 830 through the second opening region 802b.

In a state in which the optical device 600 is installed in the pouch 830, one region of the optical device 600 is exposed outwardly. However, the optical device 600 may be more stably coupled by the guide protrusion and the guide recess.

A pouch 840 including a hooking protrusion 841 coupled to the clip module 700 according to another exemplary embodiment of the present disclosure will be described. Referring to FIG. 5A(a), the optical device according to an exemplary embodiment of the present disclosure includes clip modules having various structures to be installed in the frame 401. The pouch 840 receives the optical device 600 separated from the first frame 401.

Referring to FIGS. 13C and 5A(a), the hooking protrusion 841 may be formed in an internal space of the pouch 840, and may be formed on an inner surface of the second support surface 801b. The hooking protrusion 841 has a structure corresponding to the clip module 700 and may extend in the first direction D1.

The hooking protrusion 841 may be inserted into a space in which the clip module 700 and the first body 601 are formed. That is, the clip module 700 may move along the first direction D1 so as to be received in the pouch 840. Accordingly, the optical device 600 may be stably received in the pouch 840 without any additional fixing structure.

As described above, the pouch may be electrically connected to the optical device 600 and charge the optical device 600 by using a battery formed in the pouch. Also, the pouch and the optical device may include a wireless communication unit to perform wireless communication each other. For example, information may be transmitted and received between the optical device and the pouch. Hereinafter, a control method of the terminal system in which the clip type terminal and a pouch are combined will be described.

Figure 14:
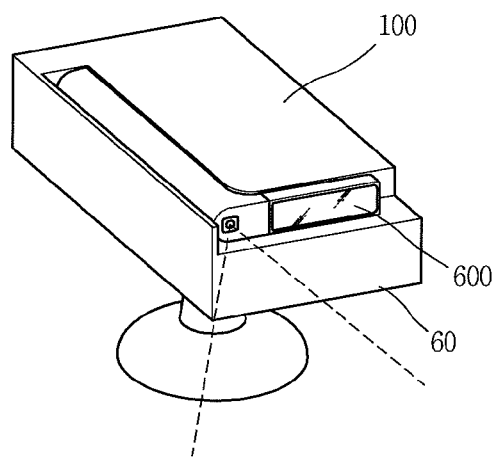
FIG. 14 is a conceptual view illustrating an embodiment in which a detachable optical device is coupled to a support device and driven.

FIG. 14 is a conceptual view illustrating an embodiment in which a detachable optical device is coupled to a support device 60 and driven. The optical device 600 includes a control unit and a power supply unit independently, and thus, the optical device 600 may be driven in a state in which the optical device 600 is separated from the glass type terminal 400. The support device 60 includes a receiving space for receiving the optical device 600 in a state in which the display unit 651 is exposed.

The optical device 600 may project an image in a state of being supported by the support device 60.

Figure 15A:
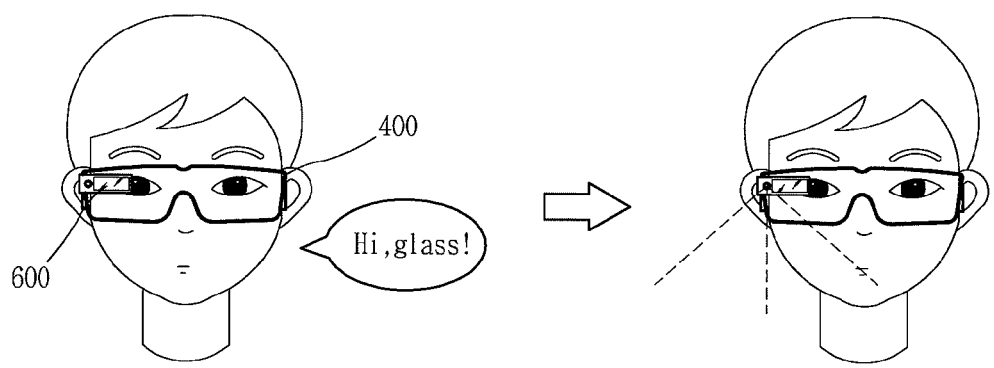
FIGS. 15A and 15B are conceptual views illustrating a control method of the detachable optical device.
Figure 15B:
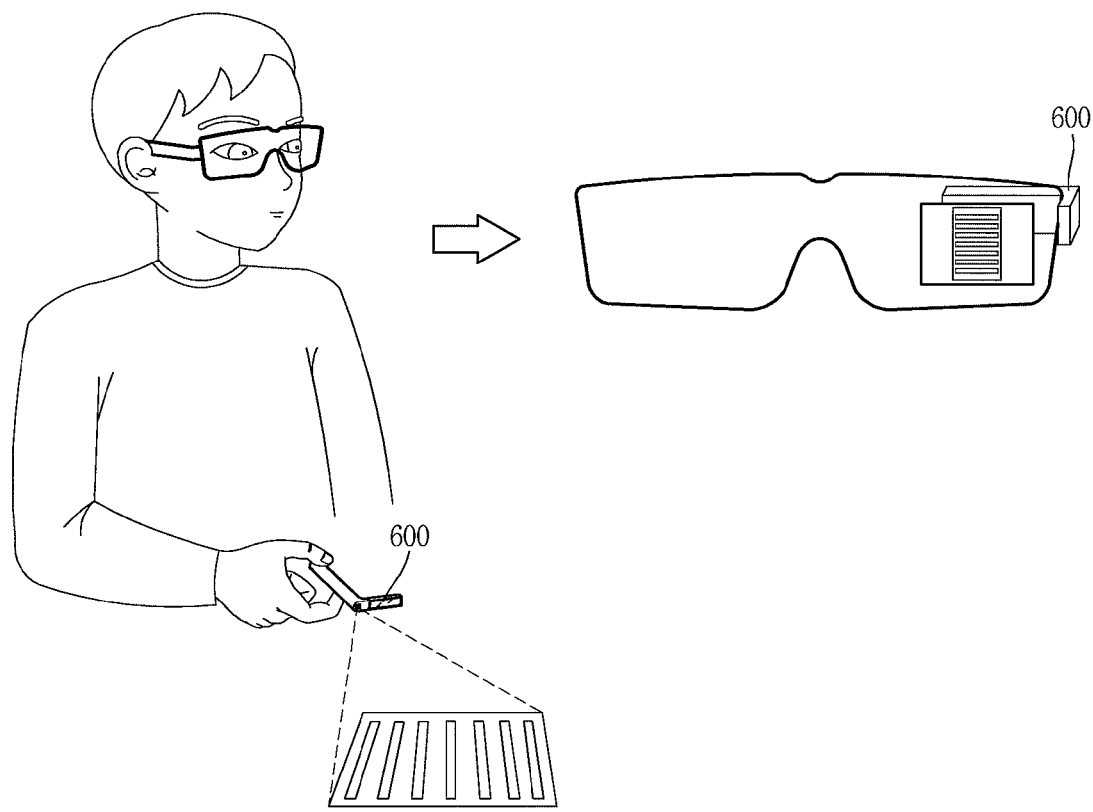

FIGS. 15A and 15B are conceptual views illustrating a control method of a detachable optical device. Referring to FIG. 15A, in a state in which the optical device 600 is fixed to the glass type terminal 400, power of the optical device 600 may be turned off and only power of the glass type terminal 400 may be turned on.

In this case, a microphone of the glass type terminal 400 may sense a user's voice command. A control command of the glass type terminal 400 may form a control signal for turning on the optical device 600 on the basis of the voice command.

Referring to FIG. 15B, the optical device 600 may be driven in a state of being separated from the glass type terminal. The user may separate the optical device 600 from the glass type terminal 600 and capture an image by using a camera of the optical device 600.

Figure 16A:
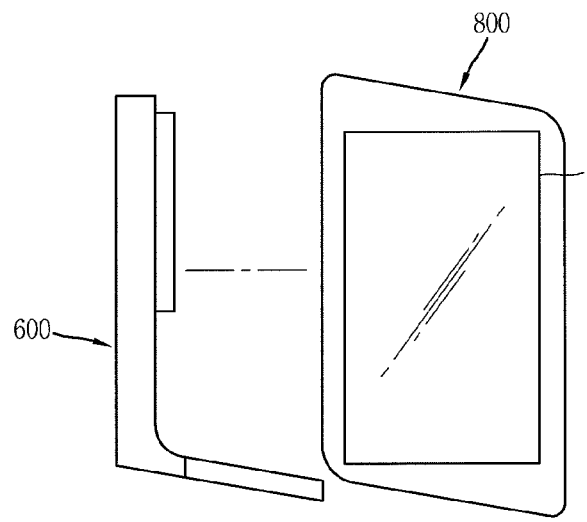
FIGS. 16A(a) through 16D(b) are conceptual views illustrating a control method of a terminal system in a state in which an optical device and a pouch are combined.
Figure 16A:
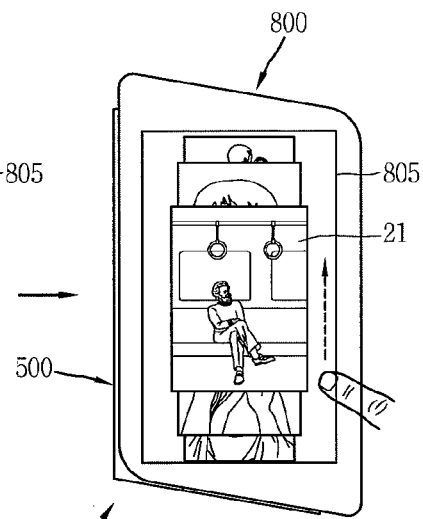
Figure 16A:
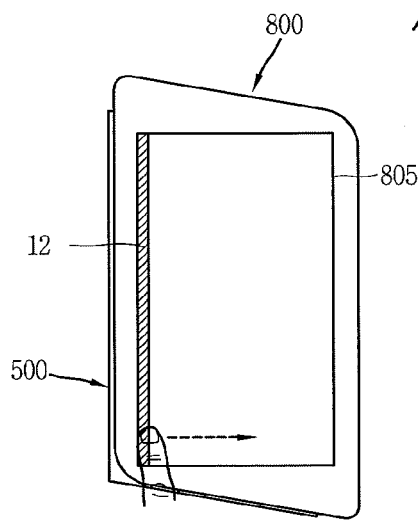
Figure 16A:
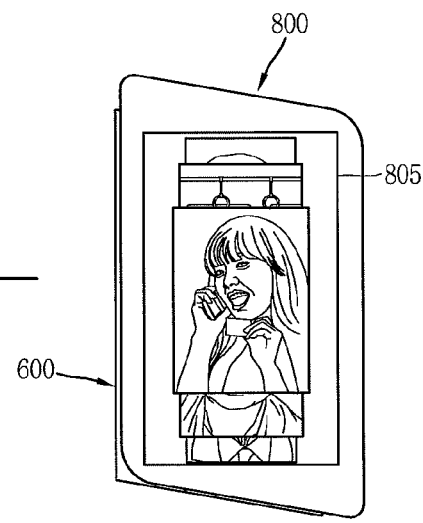

FIGS. 16A(a) through 16D(b) are conceptual views illustrating a control method of a terminal system in a state in which an optical device and a pouch are combined.

A control method of outputting information collected by the optical device through a pouch when the optical device is coupled to the pouch will be described.

A pouch 800 according to the present exemplary embodiment may further include a display unit 805. For example, the display unit 805 may be formed on the first support surface 801a of the pouch 800, and a size and a shape of the display unit 805 are not limited to those illustrated in the drawings. For example, the display unit 805 may have a shape corresponding to the first support surface 801*a* or may have a shape and a size for outputting only characters. Also, the display unit 805 may include a touch sensor for receiving the user's touch input.

Also, the pouch 800 may have an independent battery for driving the display unit 805 and a control unit for controlling components of the pouch 800.

Referring to FIGS. 16A(a) and 16A(b), when the optical device 600 is installed in the pouch 800, the display unit 805 may be activated. When it is sensed that the optical device 600 is installed in the pouch 800, the control unit may control the wireless communication unit or the interface unit to receive data from the optical device 600.

However, data may be transmitted and received only in a case in which a user's control command is received in a state in which the optical device 600 is installed in the pouch 800 according to a user setting.

For example, the data may be visual data including a photo image, video, and the like, captured by the camera 621, hearing data including a user's voice input by the microphone and a recorded sound of a surrounding environment, various functions executed through an input of a voice command and a user input unit 623, and visual data output through the display unit 651. Types and formats of data transmitted from the optical device 600 to the pouch 800 are not limited.

The display unit 805 of the pouch 800 output the received data as first screen information 21. For example, the display unit 805 may arrange the data in time order and output the same. Referring to FIGS. 16A(b) and 16A(c), the display unit 805 may output images arranged in time order. Also, the control unit may control the display unit 805 to sequentially output data arranged in time order on the basis of user's touch input applied to the display unit 805.

Received data may be set as data collected by the optical device 600 from a moment the optical device 600 was lately separated from the pouch 800, but the present disclosure is not limited thereto. The user may set a period during which data to be received in the pouch 800 is to be stored, types of data, and the like.

Referring to FIGS. 16A(c) and 16A(d), in a case in which the optical device 600 is installed in the pouch 800, when a preset time t has lapsed, the control unit may control the display unit 805 to limit output of the data.

Meanwhile, the display unit 805 displays second notification information 12 indicating a state in which the optical device 600 is installed. For example, the second notification information 12 may be output to one region of the display unit 805 adjacent to the optical device 600. Accordingly, power consumption for outputting data to the display unit 805 may be reduced.

Also, in a case in which there is no control command applied to the display unit 805 for more than a reference time, the control unit may switch the display unit 805 to a deactivated state.

In a state in which the display unit 805 is activated, when the optical device 600 is separated from the pouch 800, the display unit 805 may be switched to a deactivated state.

Referring to FIGS. 16A(d) and 16A(b), on the basis of a touch input applied to the second notification information 12, the control unit controls the display unit 805 to output the first screen information 21 again.

Although not specifically shown in the drawings, in a case in which the pouch 800 includes a memory, the control unit may provide control to store the received data in the memory.

According to the present exemplary embodiment, when the optical device stops driving and is disposed in the pouch 800, the user can be provided with driving information of the optical device 600.

Figure 16B:
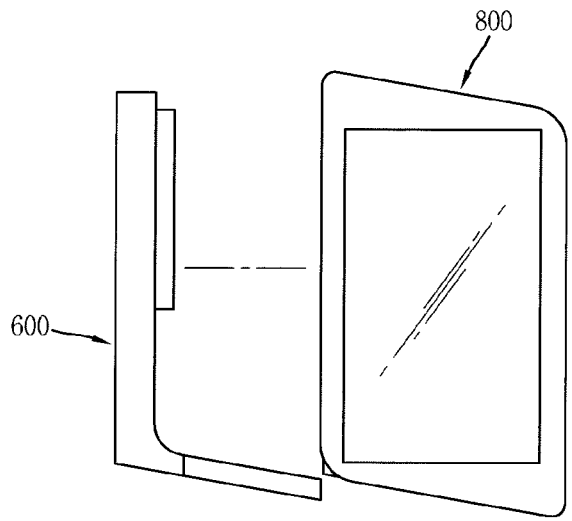
Figure 16B:
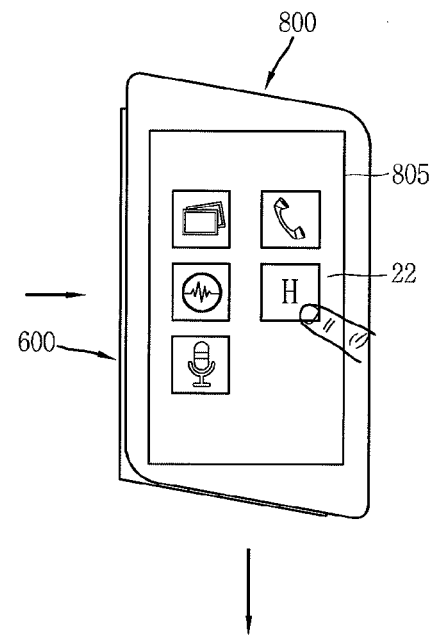
Figure 16B:
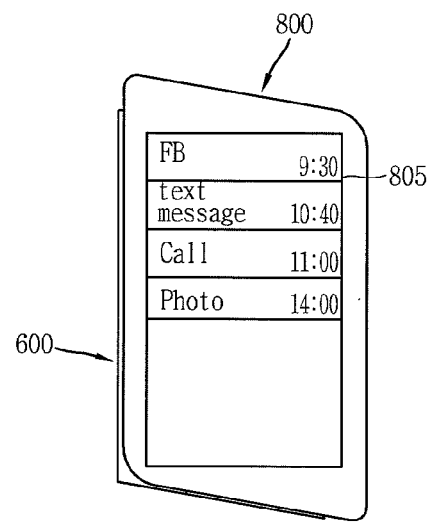

A control method of providing second screen information indicating driving information of the optical device will be described with reference to FIGS. 16B(a) through 16B(c). Referring to FIGS. 16B(a) and 16B(b), when it is sensed that the optical device 600 is installed in the pouch 800, data is received from the optical device 600. Also, on the basis of the received data, the display unit 805 outputs the second screen information 22.

The received data is classified into categories, and the second screen information includes icons corresponding to data of each category. For example, the second screen information 22 may include an icon corresponding to information according to the user's voice command, an icon corresponding to information (image, video) captured by the camera 621, an icon corresponding to driving history of the optical device 600, an icon corresponding to information stored by the microphone, and the like.

For example, on the basis of a touch input applied to the icon corresponding to the driving history, the display unit 805 may output driving information regarding an event received by the optical device 600, transmission and reception of data, storing of information, and the like.

That is, the control unit may classify data received from the optical device 600 and provide the classified data to the user. Accordingly, the user may simply use the data generated by the optical device 600.

A control method of controlling the display unit 805 by using the user input unit 623 of the optical device 600 will be described with reference to FIGS. 16C(a) and 16C(c). In the present exemplary embodiment, the display unit 805 may have a structure in which a touch sensing unit is omitted, but the present disclosure is not limited thereto.

Figure 16C:
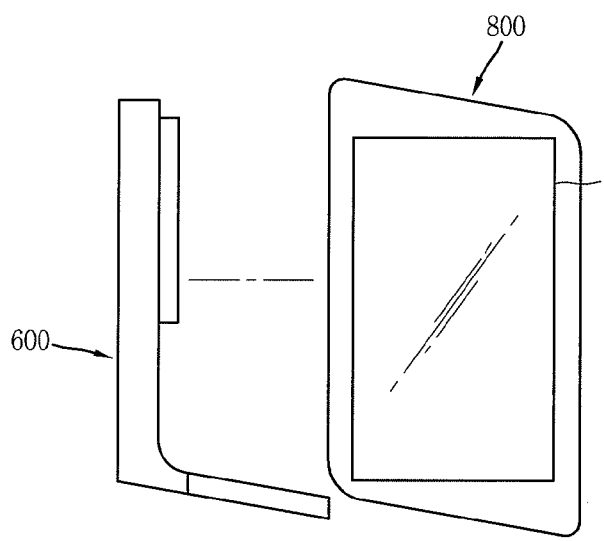
Figure 16C:
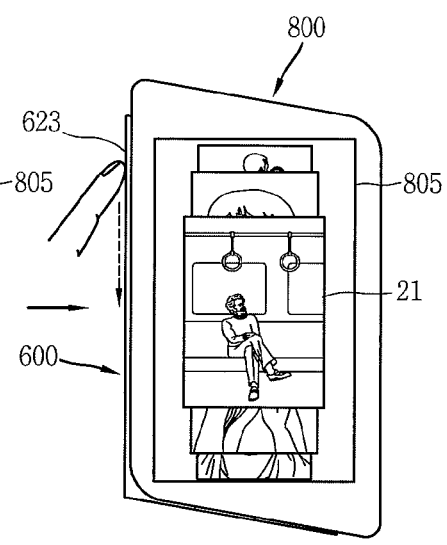
Figure 16C:
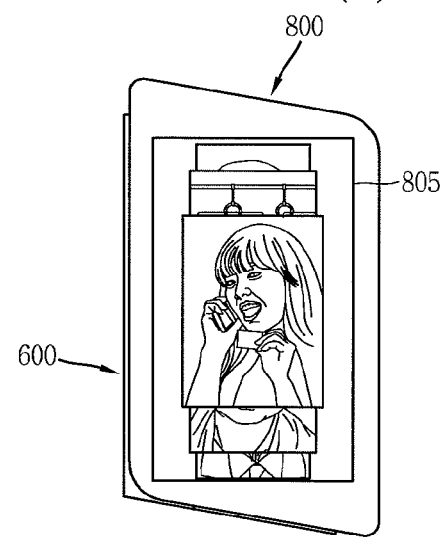

Referring to FIGS. 16C(a) and 16C(b), when the optical device 600 is installed in the pouch 800, the control unit output receive data as the first screen information 21.

Referring to FIGS. 16C(b) and 16C(c), on the basis of a touch input applied to the user input unit 623, the control unit may control the display unit to change the first screen information 21. That is, the control unit receives a control signal according to a touch input applied to the user input unit 623 of the optical device 600. For example, on the basis of the control signal, the display unit 805 may output different data according to the passage of time, as the first screen information 21.

According to the present exemplary embodiment, the display unit 805 may not require a touch sensing unit for receiving a user's touch input, and the display unit 805 may be controlled on the basis of a touch input applied to the optical device 600.

Meanwhile, although not shown in the drawings, in the terminal system in which the optical device 600 and the pouch 800 are combined, components included in the pouch 800 may be more easily controlled on the basis of a touch input applied to the optical device 600.

A control method of the display unit 805 corresponding to the first fixing portions formed as sloped surfaces will be described with reference to FIGS. 13A(a) and 16D(a). The pouch 800 includes a display unit 815 formed on the first support surface 801*a* and the first fixing portion 811. The display unit 815 includes a first region 815a formed on the first support surface 801a and a second region 815b formed on the first fixing portion 811. The first and second regions 815a and 815b have a shape bent at a preset angle. That is, the second region 815b may be formed as a sloped surface with respect to the firs region 815a.

Figure 16D:
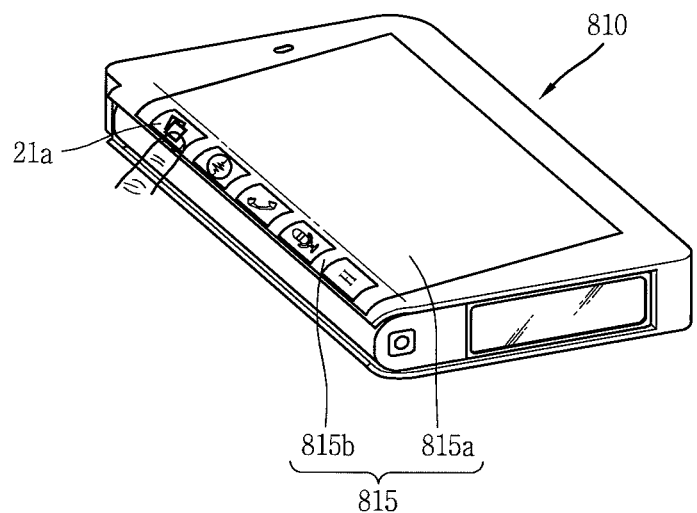
Figure 16D:
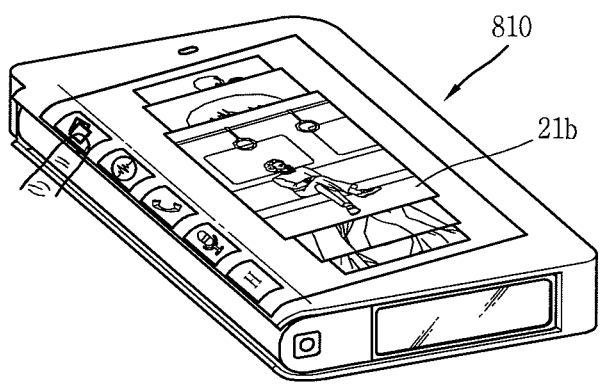

Referring to FIG. 16D(a), when the optical device 600 is installed in the pouch 810, the second region 815b outputs first screen information 21a based on the received data. Here, the first screen information 21a may correspond to images sequentially arranging received data or icons representing data classified by category.

Referring to FIGS. 16D(a) and 16D(b), on the basis of a touch input applied to the first screen information 21a, the control unit controls the display unit 815 to output subordinate information 21b on the first region 815a.

For example, in a case in which a control command is not applied while the optical device 600 is installed in the pouch 810, the control unit may control the first region 815a to be switched to a deactivated state and the second region 815b to output the data.

In another example, the second region 815b may output state information of the optical device 600, for example, information regarding a charge state, a remaining memory space, and the like.

According to the present exemplary embodiment, since data of the optical device installed in the pouch is provided through the display unit, the user may visually check the information corrected from the optical device.

Figure 17A:
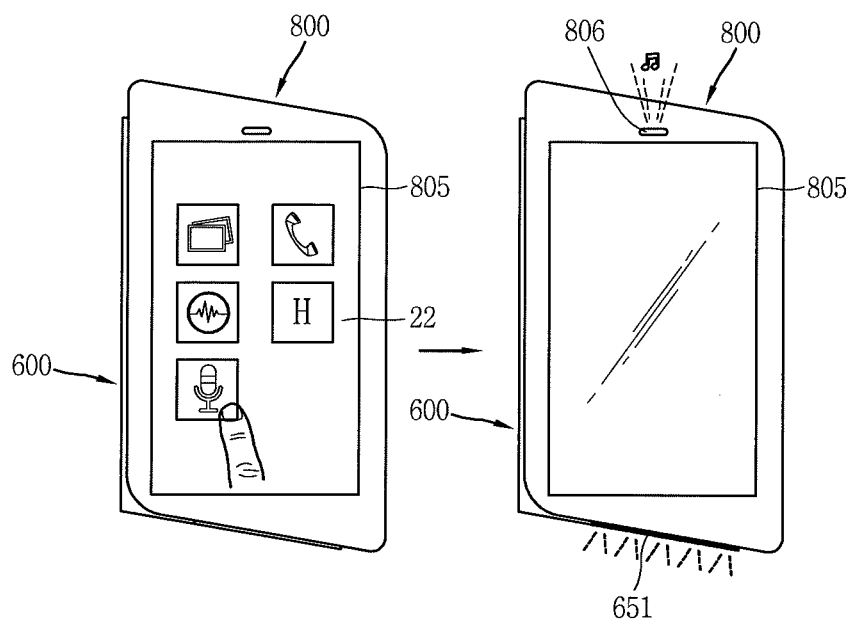
FIGS. 17A and 17B are conceptual views illustrating a terminal system in which a pouch and an optical device interwork with each other.
Figure 17B:
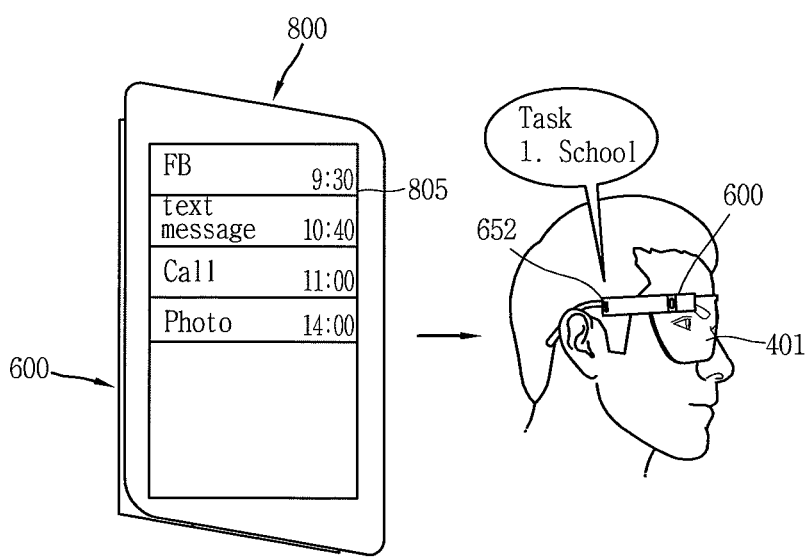

FIGS. 17A and 17B are conceptual views illustrating a terminal system in which a pouch and an optical device interwork with each other.

A method in which the display unit 651 of the optical device 600 and a speaker of the pouch 800 are driven in an interworking manner in the terminal system in which the pouch 800 and the optical device 600 are combined will be described with reference to FIG. 17A. The pouch 800 according to the present exemplary embodiment may further include a speaker outputting sound data.

On the basis of a touch input applied to an icon output on the display unit 805 of the pouch 800 and related to sound data stored from the microphone of the optical device 600, the control unit may control the speaker of the pouch to output the sound data.

As described above, in a state in which the optical device 600 is installed in the pouch 800, the display unit 651 of the optical device 600 may be exposed outwardly.

While sound data is output through the speaker, the display unit 651 may output visual information. Here, the visual information may correspond to a visual effect emitting light according to the sound data or correspond to information related to the sound data.

Through the visual information output on the display unit 651, the user may feel an aesthetic sense and detect that the output sound data has been provided by the optical device 600.

Meanwhile, while the optical device 600 is installed in the pouch 800 and the battery 519 is being charged, the display unit 651 may output visual information indicating a charge state of the battery 519.

A control method of the terminal system in which data input through the pouch 800 is provided to the optical device 600 will be described with reference to FIG. 17B.

The display unit 805 of the pouch 800 according to the present exemplary embodiment may include a touch sensor for receiving a user's touch input. While the optical device 600 is installed in the pouch 800, the display unit 805 may output a virtual keyboard. Also, the user may apply a touch input to the virtual keyboard to input text, or the like.

The control unit transmits text information input by a touch input applied to the display unit 805 to the optical device 600, and a memory provided in the optical device 600 may store the text information.

In a state in which the optical device 600 is installed in the first frame 401 and fixed to the user's body, the optical device 600 may output the text information. In detail, the audio output unit 552 of the optical device 600 may output a voice signal converted from the text information.

According to the present exemplary embodiment, the user may input text information through the pouch and may receive the text information as a voice signal through the optical device, information can be easily input and information can be output in a desired manner.

Figure 18A:
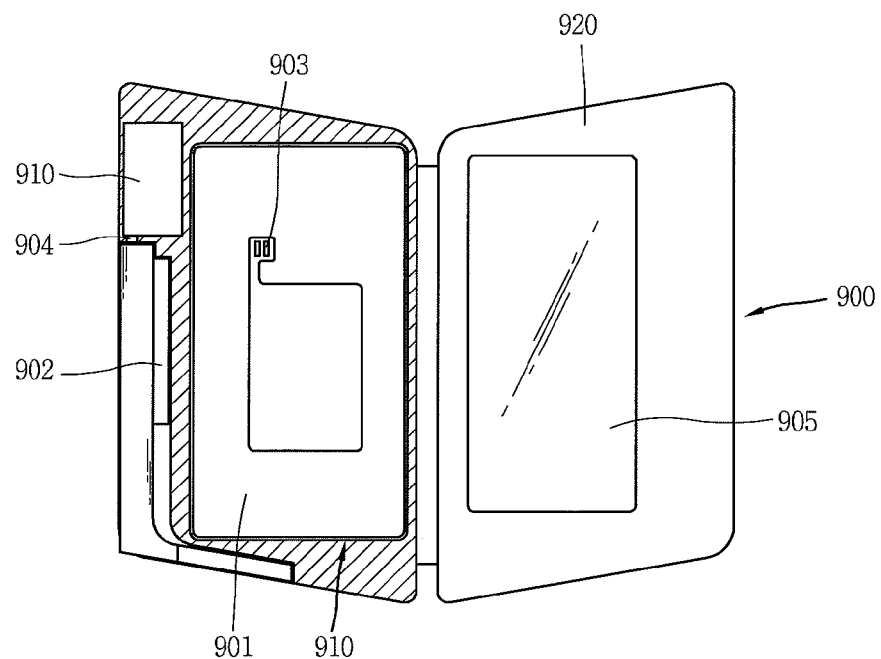
FIGS. 18A and 18B are conceptual views illustrating a terminal system according to another exemplary embodiment of the present disclosure.
Figure 18B:
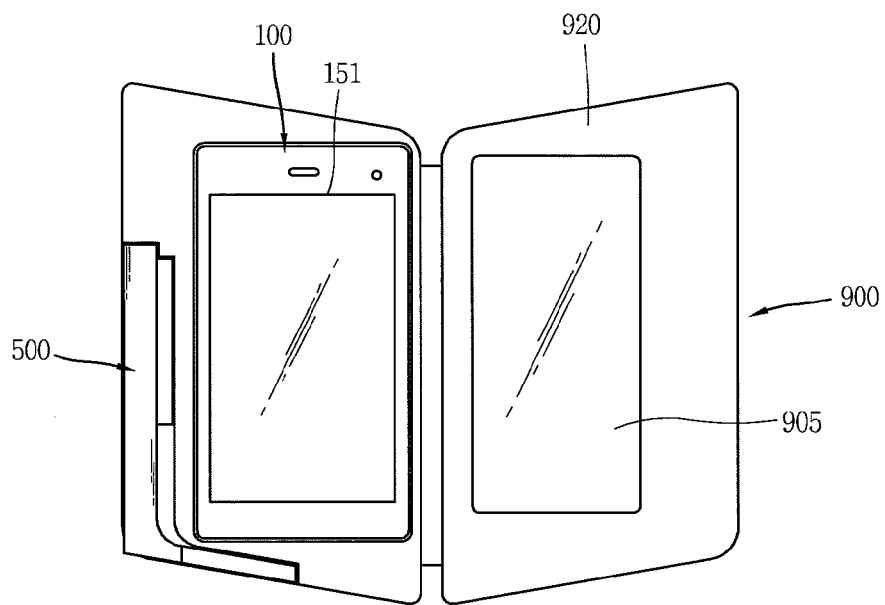

FIGS. 18A and 18B are conceptual views illustrating a terminal system according to another exemplary embodiment of the present disclosure. The terminal system according to the present exemplary embodiment includes a mobile terminal 100 different from an optical device, the optical device 600, and a case 900 for receiving the mobile terminal 100 and the optical device 600. FIG. 18A is a conceptual view illustrating a structure of the case 900 for receiving the mobile terminal 100 and the optical device 600, and FIG. 18B is a conceptual view illustrating a state in which the mobile terminal 100 and the optical device 600 are received in the case 900.

The case 900 includes a first member 910 and a second member 920. The first member 910 includes a first receiving unit 901 in which the mobile terminal 100 is received, and a second receiving unit 902 formed to receive the optical device 600. The first and second receiving unit 901 and 902 are formed to be adjacent to each other.

Also, the case 900 includes a first terminal 903 for electrically in contact with the mobile terminal 100 and a second terminal 904 for electrically in contact with the optical device 600. Also, the case 900 may further include a power supply unit electrically in contact with the optical device 600 and providing power.

Meanwhile, the first member 910 is connected to the second member 920 formed to cover the first member 910. The first and second members 910 and 920 may be configured to be switched from an opened state to a closed state or from the closed state to the opened state. The second member 920 may include an opening to check at least one of the mobile terminal 100 and the optical device 600 in the closed state.

The second member 920 may include an opening 905 formed to correspond to the display unit 151 of the mobile terminal. The opening 905 may be formed as a transparent film formed of a light-transmissive material. In the closed state, the user may be provided with an image output from the display unit 151 through the opening 905.

Although not specifically illustrated in the drawings, the case 900 may include the second receiving unit 902 formed such that the display unit 651 of the optical device 600 is exposed in the closed state.

When it is sensed that the optical device 600 is installed in the case 900, the display unit 151 of the mobile terminal 100 may output a corresponding graphic image, or the like.

In the terminal system according to the present exemplary embodiment, when the optical device 600 and the mobile terminal 100 are installed in the case 900, the optical device 600 and the mobile terminal 100 are put to a state in which they can communicate with each other wiredly or wirelessly.

Hereinafter, a control method of the terminal system according to the present exemplary embodiment will be described.

Figure 19A:
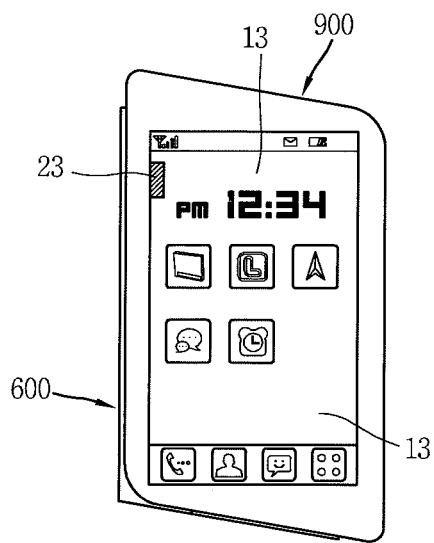
FIGS. 19A(a) through 19C(c) are conceptual views illustrating a control method of a terminal system including a mobile terminal and an optical device received in a case.
Figure 19A:
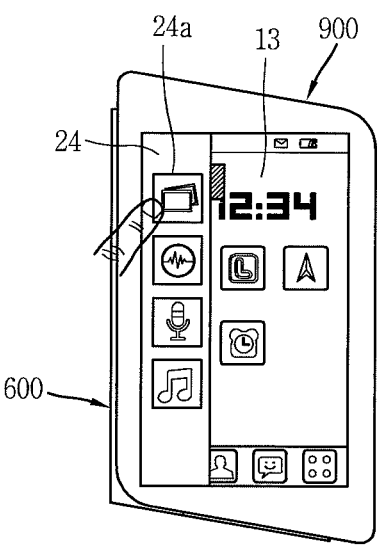
Figure 19A:
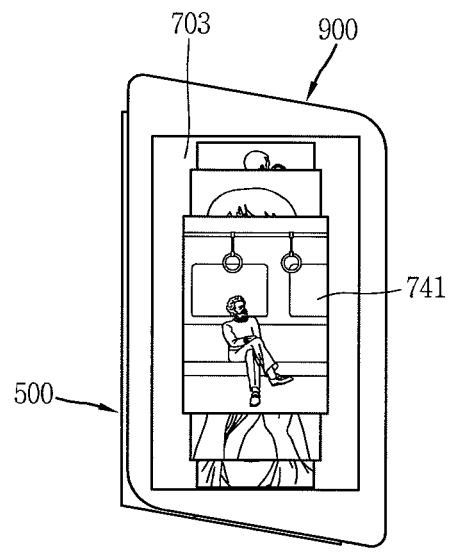

FIGS. 19A(a) through 19C(c) are conceptual views illustrating a control method of a terminal system including a mobile terminal and an optical device received in a case.

Referring to FIGS. 19A(a) through 19A(c), when the mobile terminal and the optical device 600 are installed in the case 900, the mobile terminal 100 and the optical device 600 may transmit and receive data.

When the optical device 600 is sensed, the display unit 151 of the mobile terminal 100 may be activated and output third notification information 23. The display unit 151 outputs a preset page 13 and output the page 13 and the third notification information together. Here, the page 13 may be an execution screen of an application executed in the mobile terminal 100, a home screen page, a preset image, and the like, without being limited.

Even though the page 13 is changed, the third notification information 23 may be displayed in a preset position of the display unit 151. The third notification information 23 may be displayed in a region adjacent to the optical device 600.

By the third notification information, the user may recognize that the optical device 600 has been installed in the case 900 and connected to the mobile terminal 100 wiredly or wirelessly.

Referring to FIGS. 19A(a) and 19A(b), on the basis of a touch input applied to the third notification information 23, the display unit 151 outputs third screen information 24 including data received from the optical device 600. The third screen information 24 may include an image included in the data or may include an icon corresponding to a classified category, or the like.

The third screen information 24 may be output on at least one region of the display unit 151, and may display to overlap with a portion of the page 13.

Meanwhile, the display unit 151 may output the third screen information 24 to different regions of the display unit 151 according to a type of a touch input applied to the third notification information 23. For example, the display unit 151 may output the third screen information 24 on one region of the display unit 151 corresponding to a touch range of a continuous touch input applied to the third notification information 23.

When a touch input is applied to the third screen information 24, the mobile terminal 100 may receive the data from the optical device 600. Alternatively, when it is sensed that the optical device 600 is installed in the case 900, the mobile terminal 100 may receive the data.

Referring to FIGS. 19A(b) and 19A(c), on the basis of a touch input applied to the third notification information 23, the display unit 151 changes the page 13 to lower information (or sub-information) 24a related to the third notification information 23. For example, the third notification information 23 may correspond to a thumbnail view indicating data received from the optical device 600. The third notification information 23 may be output translucently on the page 13.

Accordingly, the user may independently check information provided by the optical device, while using the mobile terminal 100.

A control method of data provided from the optical device and the mobile terminal will be described with reference to FIGS. 19B(b) through 19B(d).

Figure 19B:
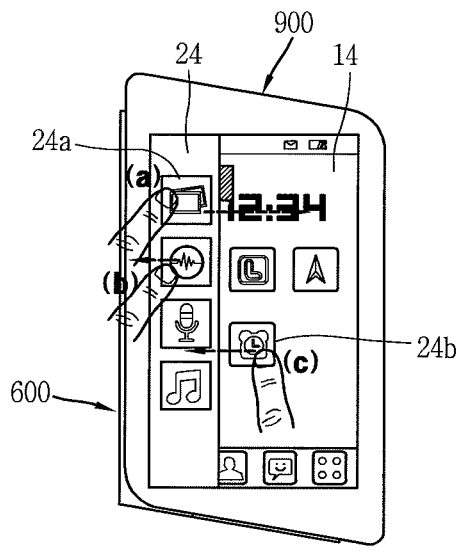
Figure 19B:
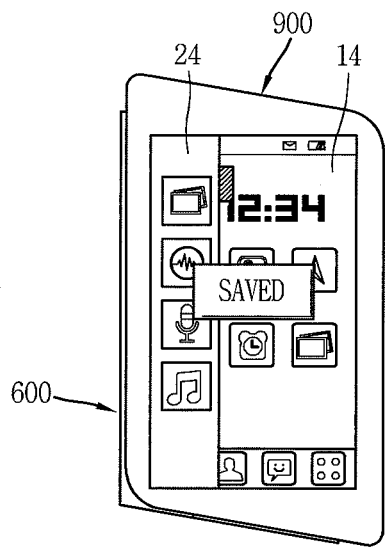
Figure 19B:
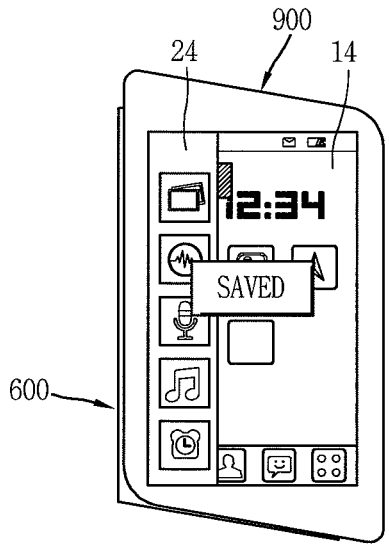
Figure 19B:
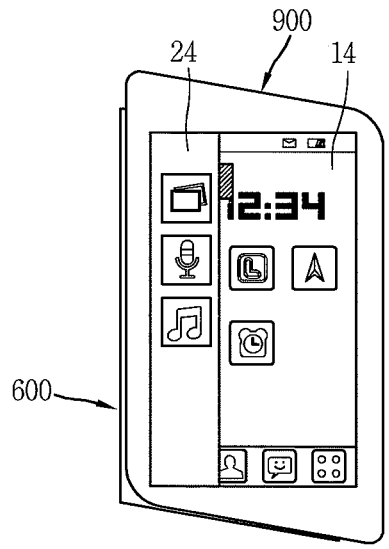

Referring to FIG. 19B(a), the display unit 151 of the mobile terminal 100 outputs the third screen information 24 including the data received from the clip terminal 600, together with fourth screen information 14. The third and fourth screen information 24 and 14 may be output in an overlapping manner or may be output to divided regions of the display unit.

For example, the third screen information 24 may include a plurality of content items corresponding to images captured by the camera 621 of the optical device 600, and the fourth screen information 14 may correspond to an execution screen of a gallery application storing images captured by the camera 121 of the mobile terminal.

Referring to FIGS. 19B(a) and 19B(b), on the basis of a first touch input applied to the third screen information 24, the control unit 180 of the mobile terminal 100 may store content 24a included in the third screen information 24 in the memory 170 of the mobile terminal 100. Here, the first touch input may be a drag type touch input first applied to the content 24a and released from the fourth screen information 14.

The control unit 180 of the mobile terminal 100 may control the display unit 151 to output the selected content 24a to output on the fourth screen information 14.

Referring to FIGS. 19B(a) and 19B(c), on the basis of a second touch input applied to the display unit 151 of the mobile terminal 100, the control unit of the optical device 600 may provide control to delete particular data from the memory of the optical device 600.

The display unit 151 outputs the third screen information 24 including content items. The control unit may limit output of the content selected by the continuous second touch input applied to the content, and delete the content 24a from the memory. The second touch input may correspond to a touch input first applied to the content 24a and is moving in a direction toward the edge of the display unit 151 or in a direction toward the region in which the optical device 600 is received.

Accordingly, the user may edit data stored in the optical device 600 by using the mobile terminal.

Referring to FIGS. 19B(a) and 19B(d), on the basis of a third touch input applied to the fourth screen information 14, content 24b stored in the memory 170 of the mobile terminal 100 may be transmitted to the optical device 600. Here, the third touch input may correspond to a drag type touch input first applied to the content 24b of the fourth screen information 14 and released from the third screen information 24.

When the optical device 600 is fixed to the first frame 401 and driven, the optical device 600 may output content received from the mobile terminal 100.

That is, the user may transmit and receive data independently stored in the mobile terminal 100 and the optical device 600 and receive the data by a desired terminal.

A control method of providing relevant data which is related to data provided from the optical device 600 and stored in the memory 170 of the mobile terminal 100 will be described with reference to FIGS. 19C(a) and 19C(c).

Figure 19C:
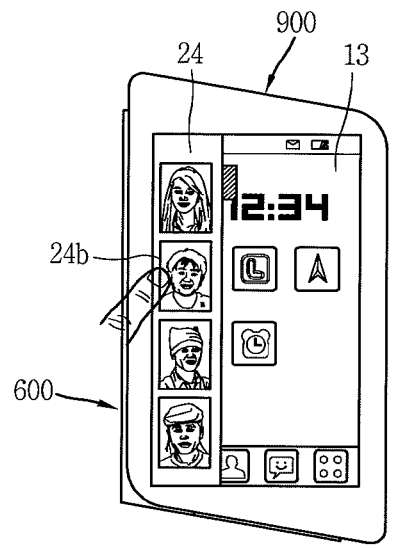
Figure 19C:
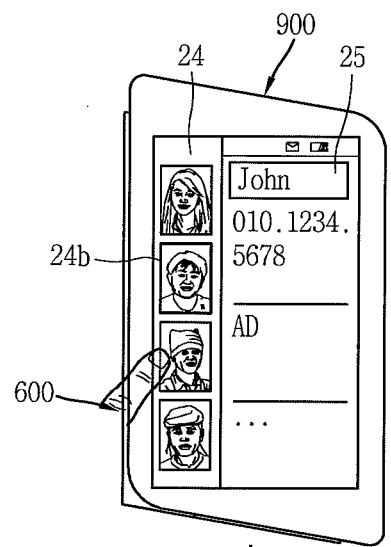
Figure 19C:
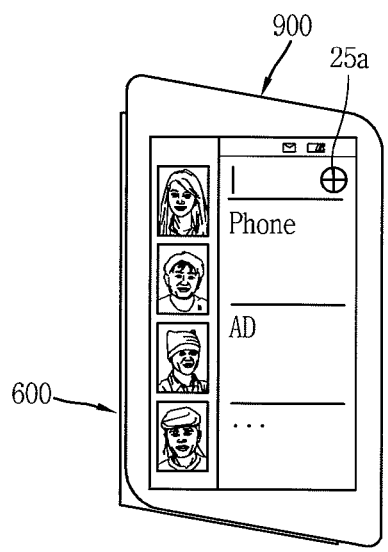

Referring to FIG. 19C(a), in the terminal system in which the optical device 600 and the mobile terminal 100 are installed in the case 900, the display unit 151 of the mobile terminal 100 outputs fifth screen information 25 and the page 13 together. For example, the fifth screen information 25 may include a character image 24b captured by the camera 652 of the optical device 600.

Referring to FIGS. 19C(a) and 19C(b), on the basis of a touch input applied to the character image 24b, the control unit of the mobile terminal 100 may search data related to the character image 24b from the memory 170 of the mobile terminal 100. For example, the related data may correspond to address list information including a photo image matched to the character image 24b, and the like. The display unit 151 may output fifth information 25 including the related data together with the character image 24*b*.

Content included in the fifth screen information 25 is not limited to the character image. For example, in a case in which the fifth screen information 25 corresponds to an image obtained by capturing a building, the control unit may search information related to the building from a server by using the wireless communication unit of the mobile terminal 100 or may search information related to the building from the memory 170 of the mobile terminal 100.

Referring to FIG. 19C(c), in a case in which information related to the selected content is not searched, the control unit 180 may control the display unit 151 to output an input screen 25*a* for inputting related information.

Figure 20A:
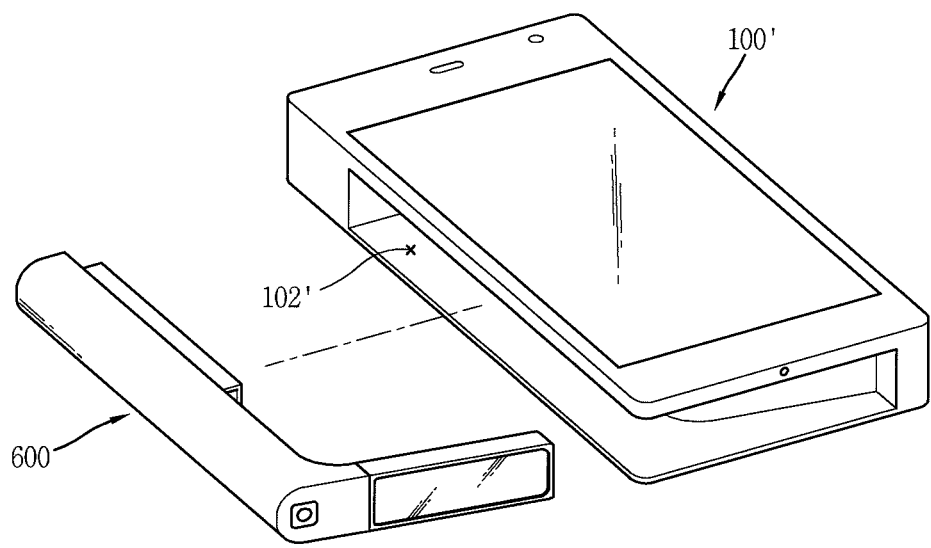
FIGS. 20A and 20B are conceptual views illustrating a terminal system according to another exemplary embodiment of the present disclosure.
Figure 20B:
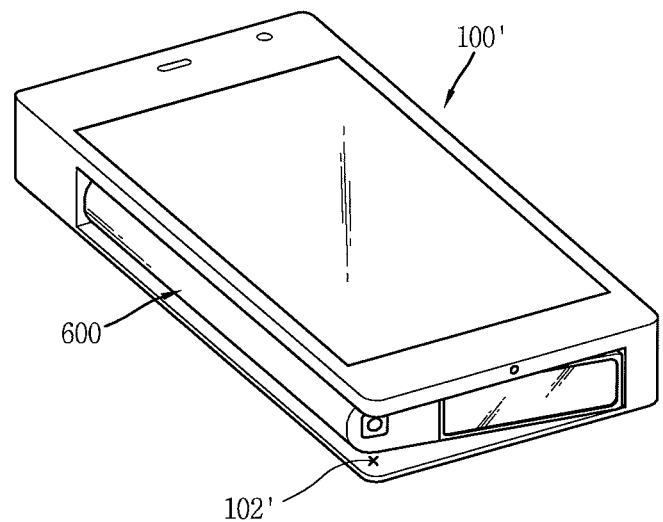

FIGS. 20A and 20B are conceptual views illustrating a terminal system according to another exemplary embodiment of the present disclosure. The terminal system according to the present exemplary embodiment is realized as a mobile terminal 100' including a third receiving unit 102' in which the optical device 600 is installed.

The third receiving unit 102' is formed in the rear case 102 forming the side of the mobile terminal 100' and is depressed from the side of the mobile terminal 100'. The third receiving unit 102' may include a depressed shape corresponding to the shape of the optical device 600.

Also, the third receiving unit 102' may include a terminal unit that may be electrically connected to the optical device 600, a fixing portion formed to fix the optical device 600, and the like.

Also, in a state in which the optical device 600 is received in the third receiving unit 102', the optical device 600 may be provided with power from the power supply unit 190 of the mobile terminal 100'.

Figure 21A:
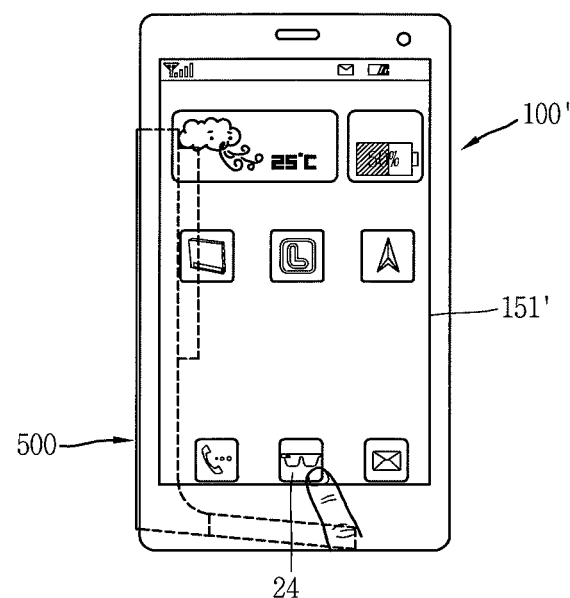
FIGS. 21(a) and 21(b) are conceptual views illustrating a control method of a terminal system including an optical device installed in a mobile terminal according to an exemplary embodiment of the present disclosure.
Figure 21B:
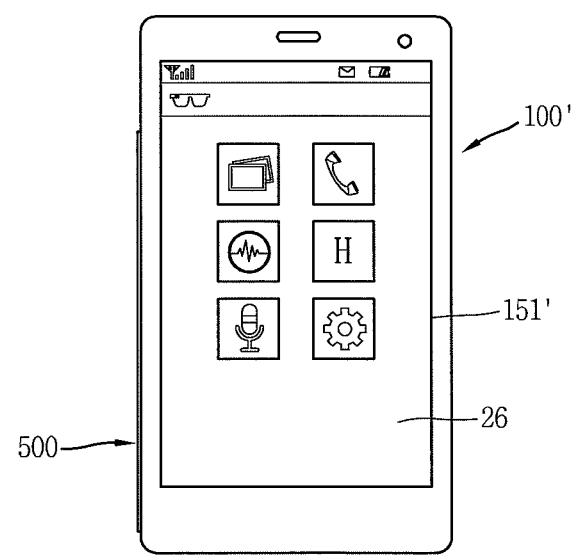

FIGS. 21(*a*) and 21(*b*) are conceptual views illustrating a control method of a terminal system including an optical device installed in a mobile terminal according to an exemplary embodiment of the present disclosure. When the optical device 600 is installed in the third receiving unit 102', a display unit 151' of the mobile terminal 100' outputs fourth notification information 24 indicating the corresponding fact. The fourth notification information 24 may correspond to an icon indicating the optical device 600, or the like.

On the basis of a touch applied to the fourth notification information, the display unit 151' outputs sixth screen information 26 for controlling the optical device 600.

The sixth screen information 26 includes an icon for outputting data included in the optical device 600, an icon for changing a setting of the optical device 600, and the like. That is, the user may control the optical device 600 through the sixth screen information 26.

Also, the sixth screen information 26 includes an icon for receiving a touch input to control the mobile terminal 100'.

Thus, in case of the optical device that can be integrally coupled to the mobile terminal, the optical device may be controlled by using an input unit and an output unit of the mobile terminal.

The components and the method of the mobile terminal and the mobile terminal with a cover installed therein according to the exemplary embodiments described above are not limitedly applied but the entirety or a portion of the exemplary embodiments may be selectively combined to be variously modified.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wearable glasses terminal comprising:
    a frame wearable by a user, the frame including a main circuit board;
    an optical device detachably attached to the frame, the optical device including:
        a body; and
        a display provided in the body; and
    a clip module configured to detachably connect the optical device to the frame,
    wherein, when the optical device is fixed to the frame and worn by the user, the display is arranged so as to be adjacent to a user's eye so as to provide visual information,
    wherein the clip module includes:
        an assembly protrusion having a first region protruding from one surface of the body and a second region extending from the first region in a direction in which the body extends, so as to be spaced apart from the body;
        an assembly recess formed on the frame including a recess region corresponding to the first and second regions, and an internal space in which the second region is inserted according to rotation of the body;
        a first connection terminal formed on an outer surface of the second region; and
        a second connection terminal extending from the main circuit board and disposed in the internal space,
    wherein a thickness of the first region is greater than that of the second region, and
    wherein the internal space is formed to have a fan shape allowing the second region to rotate therein.

2. The wearable glasses terminal of claim 1, wherein the clip module includes:
    a fixing portion configured to be movable in the body; and
    a hooked portion extending from the fixing portion, the hooked portion being bent at least one time so as to be retained by the frame.

3. The wearable glasses terminal of claim 2, wherein the clip module includes a fastening pin configured to penetrate the fixing portion and the body, the clip module being attached to the body such that the clip module is rotatable with respect to the fastening pin.

4. The wearable glasses terminal of claim 2, wherein the clip module includes a support portion bent from the hooked portion, the support portion being configured to support the frame positioned between the body and the hooked portion.

5. The wearable glasses terminal of claim 2, wherein the clip module includes an elastic member configured to apply elastic force to move the hooked portion toward the body.

6. The wearable glasses terminal of claim 2, further comprising:
a pressing key formed on one surface of the body facing the hooked portion and configured to be pressed between the hooked portion and the frame,
wherein the display outputs notification information indicating whether the clip module is fixed to the frame according to whether the pressing key is pressed.

7. The wearable glasses terminal of claim 1, wherein the clip module includes:
a circuit board;
a fastening screw fastened to the assembly protrusion, the fastening screw penetrating through the circuit board located in the optical device; and
a first elastic support portion extending between the fastening screw and an inner surface of the body, the first elastic support portion elastically supporting the fastening screw.

8. The wearable glasses terminal of claim 7,
wherein the first connection terminal is provided between the fastening screw and the circuit board,
wherein the second connection terminal is disposed in the frame and exposed to the assembly recess,
wherein the assembly protrusion is formed of a conductive material, and
wherein the wearable glasses terminal further includes a second elastic member located with the frame, the second elastic member elastically supporting the main circuit board within the frame.

9. The wearable glasses terminal of claim 8, wherein the assembly recess is formed to penetrate one surface of the frame facing the body, and
wherein the clip module further includes:
an assembly flange provided to cover an outer circumferential surface of the assembly protrusion; and
a connection recess formed at the outer circumferential surface of the assembly protrusion.

10. The wearable glasses terminal of claim 9, wherein the main circuit board includes a hole corresponding to the assembly recess, and
the second connection terminal is an electrode plate having an annular structure having an inner circumference smaller than the hole, so as to be in contact with the connection recess of the clip module.

11. The wearable glasses terminal of claim 1, wherein the assembly recess includes a fixing protrusion formed in the internal space,
wherein the clip module includes a fixing recess formed in the second region, and
wherein, when the second region is inserted into the internal space, the fixing protrusion is inserted into the fixing recess.

12. The wearable glasses terminal of claim 11, wherein the clip module further includes:

a first magnet in the body; and
a second magnet in the frame, the second magnet having a pole different from that of the first magnet.

13. The wearable glasses terminal of claim 1, wherein the clip module includes:
a fixing plate; and
a fixing recess formed on one surface of the assembly protrusion,
wherein, when the assembly protrusion is inserted into the assembly recess, the fixing plate is located in the frame and inserted into the fixing recess.

14. The wearable glasses terminal of claim 1, wherein the body includes:
first and second bodies extending in mutually intersecting directions;
a hinge unit connecting the first and second bodies such that the first and second bodies rotate with respect to each other; and
a circuit board located within the hinge unit such that the circuit board is not exposed when the first and second bodies rotate relative to each other.

15. The wearable glasses terminal of claim 1, further comprising a lens connected to the frame, the display being arranged in front of the lens such that, when the optical device is fixed to the frame and worn by the user, the lens is located between the user's eye and the display.

16. A terminal system comprising:
an optical device including a clip module configured to be detachably attached to a frame fixable to a user's body;
an external device including a storage portion configured to allow the optical device separated from the frame to be connected thereto; and
a control unit configured to transmit and receive signals between the optical device and the external device,
wherein the external device includes a hooking protrusion disposed in the storage portion and the hooking protrusion corresponds to the clip module.

17. The terminal system of claim 16, wherein the external device includes a display configured to output visual data, and
wherein, when the optical device is connected to the, storage portion, the control unit transmits data from the optical device to the external device and controls the display to output screen information including the data.

18. The terminal system of claim 17, wherein the control unit classifies the data into a plurality of categories, and
wherein the screen information includes a plurality of icons corresponding to the plurality of categories.

19. The terminal system of claim 16, wherein the external device includes:
a mobile terminal configured to receive data from the optical device; and
a case configured to allow the mobile terminal and the optical device to be installed together therein.

20. The terminal system of claim 16, wherein the external device is a mobile terminal including:
a body forming an appearance of the mobile terminal; and
a display at one surface of the body,
wherein the storage portion is depressed from another surface of the body, the storage portion corresponding to a shape of the optical device.

* * * * *